(12) United States Patent
Diener et al.

(10) Patent No.: US 7,184,777 B2
(45) Date of Patent: Feb. 27, 2007

(54) SERVER AND MULTIPLE SENSOR SYSTEM FOR MONITORING ACTIVITY IN A SHARED RADIO FREQUENCY BAND

(75) Inventors: Neil R. Diener, Rockville, MD (US); David S. Kloper, Mt. Airy, MD (US); Anthony T. Collins, Silver Spring, MD (US)

(73) Assignee: Cognio, Inc., Germantown, MD (US)

( * ) Notice: Subject to any disclaimer, the term of this patent is extended or adjusted under 35 U.S.C. 154(b) by 513 days.

(21) Appl. No.: 10/717,852

(22) Filed: Nov. 19, 2003

(65) Prior Publication Data

US 2004/0137915 A1    Jul. 15, 2004

Related U.S. Application Data

(60) Provisional application No. 60/511,383, filed on Oct. 15, 2003, provisional application No. 60/508,636, filed on Oct. 3, 2003, provisional application No. 60/508,635, filed on Oct. 3, 2003, provisional application No. 60/502,947, filed on Sep. 16, 2003, provisional application No. 60/469,647, filed on May 12, 2003, provisional application No. 60/319,737, filed on Nov. 27, 2002.

(51) Int. Cl.
*H04Q 7/20* (2006.01)
(52) U.S. Cl. .................................. 455/456.1
(58) Field of Classification Search ............. 455/456.1, 455/422.1, 403
See application file for complete search history.

(56) References Cited

U.S. PATENT DOCUMENTS

| | | | |
|---|---|---|---|
| 4,839,582 A | 6/1989 | Fukaya et al. ............ 324/77 B |
| 5,093,927 A | 3/1992 | Shanley ..................... 455/513 |
| 5,142,691 A | 8/1992 | Freeburg et al. ........... 455/63.3 |
| 5,144,642 A | 9/1992 | Weinberg et al. ............. 375/10 |

(Continued)

FOREIGN PATENT DOCUMENTS

JP    2000-022712    1/2000

(Continued)

OTHER PUBLICATIONS

Monks et al, "A Power Controlled Multiple Access Protocol for Wireless Packet Networks," 2001, IEEE Infocom 2001.

(Continued)

*Primary Examiner*—William D. Cumming
(74) *Attorney, Agent, or Firm*—Edell, Shapiro & Finnan, LLC

(57) ABSTRACT

An intelligent spectrum management (ISM) system and method are provided that includes sophisticated features to detect, classify, and locate sources of RF activity. The system comprises one or more sensors positioned at various locations in a region where activity in a shared radio frequency band is occurring and a server coupled to the sensors. Each sensor monitors communication traffic, such as IEEE WLAN traffic, as well as classifies non-WLAN signals occurring in the frequency band. The server receives data from each of the plurality of sensors and that executes functions to process the data supplied by the plurality of sensors. In particular, the server aggregates the data generated by the sensors and generates event reports and other configurable information derived from the sensors that is interfaced to a client application, e.g., a network management station.

55 Claims, 13 Drawing Sheets

U.S. PATENT DOCUMENTS

| | | | |
|---|---|---|---|
| 5,276,908 A | 1/1994 | Koohgoli et al. | 455/34.1 |
| 5,355,522 A | 10/1994 | Demange | 455/62 |
| 5,428,819 A | 6/1995 | Wang et al. | 455/454 |
| 5,574,979 A | 11/1996 | West | 455/63.1 |
| 5,608,727 A | 3/1997 | Perreault et al. | 370/462 |
| 5,610,839 A | 3/1997 | Karolak et al. | 455/450 |
| 5,636,140 A | 6/1997 | Lee et al. | 370/469 |
| 5,655,217 A | 8/1997 | Lemson | 455/513 |
| 5,696,903 A | 12/1997 | Mahany | 395/200.58 |
| 5,732,077 A | 3/1998 | Whitehead | 370/349 |
| 5,745,777 A | 4/1998 | English et al. | 375/228 |
| 5,809,427 A | 9/1998 | Perreault et al. | 455/513 |
| 5,850,596 A | 12/1998 | Reynolds | 455/63.1 |
| 5,864,541 A | 1/1999 | Abu-Amara et al. | 370/253 |
| 5,889,772 A | 3/1999 | Fischer et al. | 370/346 |
| 5,907,812 A | 5/1999 | Van De Berg | 455/461 |
| 5,930,733 A | 7/1999 | Park et al. | 702/76 |
| 6,031,833 A | 2/2000 | Fickes et al. | 370/349 |
| 6,084,919 A | 7/2000 | Kleider et al. | 375/285 |
| 6,131,013 A | 10/2000 | Bergstrom et al. | 455/450 |
| 6,141,565 A | 10/2000 | Feuerstein et al. | 455/560 |
| 6,167,237 A | 12/2000 | Rapeli | 455/63 |
| 6,169,728 B1 | 1/2001 | Perreault et al. | 370/235 |
| 6,212,566 B1 | 4/2001 | Vanhoof et al. | 709/230 |
| 6,226,680 B1 | 5/2001 | Boucher et al. | 709/230 |
| 6,229,799 B1 | 5/2001 | Caillerie et al. | 370/347 |
| 6,229,998 B1 | 5/2001 | Hamdy et al. | 455/226.1 |
| 6,256,478 B1 | 7/2001 | Allen | 455/63.1 |
| 6,275,695 B1 | 8/2001 | Obhan | 455/423 |
| 6,295,461 B1 | 9/2001 | Palmer et al. | 455/557 |
| 6,307,839 B1 | 10/2001 | Gerszberg et al. | 370/235 |
| 6,317,599 B1 | 11/2001 | Rappaport et al. | 455/446 |
| 6,332,076 B1 | 12/2001 | Shah et al. | 455/423 |
| 6,349,198 B1 | 2/2002 | Carlson et al. | 455/63.1 |
| 6,351,643 B1 | 2/2002 | Haartsen | 455/450 |
| 6,366,780 B1 | 4/2002 | Obhan | 455/423 |
| 6,374,079 B1 | 4/2002 | Hsu | 455/11.1 |
| 6,374,082 B1 | 4/2002 | Carlson | 455/63.1 |
| 6,385,434 B1 | 5/2002 | Chuprun et al. | 455/11.1 |
| 6,418,131 B1 | 7/2002 | Snelling et al. | 370/337 |
| 6,442,507 B1 | 8/2002 | Skidmore et al. | 702/186 |
| 6,499,006 B1 | 12/2002 | Rappaport et al. | 703/20 |
| 6,584,175 B1 | 6/2003 | Kibria et al. | 379/1.03 |
| 6,629,151 B1 | 9/2003 | Bahl | 709/250 |
| 2001/0008837 A1 | 7/2001 | Takahashi | 455/403 |
| 2002/0006799 A1 | 1/2002 | Rappaport et al. | 455/446 |
| 2002/0019214 A1 | 2/2002 | Brown et al. | 455/67.1 |
| 2002/0077787 A1 | 6/2002 | Rappaport et al. | 702/188 |
| 2002/0085503 A1 | 7/2002 | Hulyalkar et al. | 370/252 |
| 2002/0086641 A1 | 7/2002 | Howard | 455/67.1 |
| 2002/0111772 A1 | 8/2002 | Skidmore et al. | 702/186 |
| 2002/0142744 A1 | 10/2002 | Okanoue et al. | 455/226.1 |
| 2002/0154614 A1 | 10/2002 | Jagger et al. | 375/332 |
| 2002/0155811 A1 | 10/2002 | Prismantas et al. | 455/226.1 |
| 2002/0177446 A1 | 11/2002 | Bugeja et al. | 455/450 |
| 2003/0021237 A1 | 1/2003 | Min et al. | 370/252 |
| 2003/0050012 A1 | 3/2003 | Black et al. | 455/62 |
| 2003/0050070 A1 | 3/2003 | Mashinsky et al. | 455/452 |
| 2003/0123420 A1 | 7/2003 | Sherlock | 370/338 |
| 2003/0198200 A1 | 10/2003 | Dlener et al. | 370/329 |
| 2003/0198304 A1 | 10/2003 | Sugar et al. | 375/340 |
| 2003/0224741 A1 | 12/2003 | Sugar et al. | 455/115.1 |
| 2004/0023674 A1 | 2/2004 | Miller | 455/462 |
| 2004/0028003 A1 | 2/2004 | Diener et al. | 370/319 |
| 2004/0028123 A1 | 2/2004 | Sugar et al. | 375/224 |

FOREIGN PATENT DOCUMENTS

| | | |
|---|---|---|
| JP | 2002-022712 | 1/2000 |
| WO | WO 03/028313 A2 | 4/2003 |

OTHER PUBLICATIONS

Vaduvur Bharghavan, "Performance Evaluation of Algorithms for Wireless Medium Access," 1998, IPDS.

Garces et al., "Collision Avoidance and Resolution Multiple Access for Multichannel Wireless Networks," 1997, IEEE Infocom.

Cisco, "New Product: CiscoWorks Wireless LAN Solution Engine Software Version 1.0," Jul. 19, 2002.

Joe McGarvey, "Wi-Fi Moves Into Management Stage," Jul. 19, 2002. 802.11planet.

Wildpackets Inc., "A Wildpackets Academy Tutorial; AiroPeek and Wireless Security: Identifying and Locating Rogue Access Points," 2002.

Satapathy et al., "Etiquette Modification for Unlicensed Spectrum: Approach and Impact1," May 1998, Proceedings of the IEEE Vehicular Technology Conference, vol. 1, pp. 272-276.

Dewayne Hendricks, "Is there Part 15 Congestion? Part II," Sep. 27, 2000, FCC TAC.

FCC, "Report: Second Meeting of FCC Technological Advisory Council II," Nov. 28, 2001.

FCC, "Report: First Meeting of FCC Technological Advisory Council II," Aug. 26, 2001.

Stamatelos et al., "Spectral Efficiency and Optimal Base Placement for Indoor Wireless Networks," May 1996, IEEE Journal on Selected Areas in Communications.

Jon Peha, "Spectrum Management Policy Options," IEEE Communications Surveys, vol. 1, No. 1.

Stefan Pettersson, "Performance and Implementation Aspects of Wireless Indoor Communication Systems with Local Centralization," Apr. 2000, Dissertation submitted to the Royal Institute of Technology.

Mobilian Corporation, "Wi-Fi™ (802.11b) and Bluetooth™: An Examination of Coexistence Approaches," 2001.

BBN Technologies, "Using Signal Processing to Analyze Wireless Data Traffic," May 22, 2002, BBN Technical Memorandum No. 1321.

ISCO International, "Interference Solutions: Improve Performance Realize New Traffic," Oct. 1, 2002, CDG Technology Forum.

Dewayne Hendricks, "Is there Part 15 Congestion?," Jun. 28, 2000, FCC TAC.

Ricardo Rodrigues et al., "On the Design and Capacity Planning of a Wireless Network," 2000, IEEE.

Charles Jackson, "Distributed Channel Assignment: The Tragedy of the Commons, Oblers's Paradox, and Mad Cow Disease," Mar. 30, 2001, GWU ECE Colloquium.

Kevin Werbach, "Open Spectrum: The Paradise of the Commons," Nov. 20, 2001, Release 1.0, Ester Dysons Monthly Rept, vol. 19, No. 10.

Interlink Networks, "A Practical Approach to Identifying and Tracking Unauthorized 802.11 Cards and Access Points," 2002.

Rodrigo Garces, "An Access Etiquette for Very-Wide Wireless Bands," Oct. 12, 1998, IEEE IC3N '98: Seventh International Conference on Computers.

K. Konston, "In Pursuit of A Wireless Bill of Rights," Sep. 18, 2002, Spectrum Management Working Group FCC-TAC, pp. 1-15.

Michael Yang et al., "On the Use of Unlicensed Frequency Spectrum, Use Rule Evolution, and Interference Mitigation," Jan. 18, 2001, Adaptive Broadband.

Jon M. Peha, "Wireles Communications and Coexistence for Smart Environments," Oct. 2000, IEEE Personal Communications.

Durga P. Satapathy et al., "Spectrum Sharing Without Licenses: Opportunities and Dangers," 1996, Proceedings of the Telecommunications Policy Research Conference.

Xiaoxin Qui et al., "Network-Assisted Resource Management for Wireless Data Networks," Jul. 2001, IEEE Journal on Selected Areas of Communications, vol. 19, No. 7.

Durga, P. Satapathy et al., "A Novel Co-existence Algorithm for Unlicensed Fixed Power Devices," Sep. 2000, IEEE Wireless Communications and Networking Conference.

PCT Search Report from PCT application No. PCT/US03/13563 filed Apr. 22, 2003.

Monks et al, "A Power Controlled Multiple Access Protocol for Wireless Packet Networks," 2001, IEEE Infocom 2001. No Month Listed.

Vaduvur Bharghavan, "Performance Evaluation of Algorithms for Wireless Medium Access," 1998, IPDS. No Month Listed.

Garces et al., "Collision Avoidance and Resolution Multiple Access for Multichannel Wireless Networks," 1997, IEEE Infocom. No Month Listed.

Cisco, "New Product: CiscoWorks Wireless LAN Solution Engine Software Version 1.0," Jul. 19, 2002.

Joe McGarvey, "Wi-Fi Moves Into Management Stage," Jul. 19, 2002 802.11planet.

Wildpackets Inc., "A Wildpackets Academy Tutorial; AiroPeek and Wireless Security: Identifying and Locating Rogue Access Points," 2002. No Month Listed.

Satapathy et al., "Etiquette Modification for Unlicensed Spectrum: Approach and Impact1," May 1998, Proceedings of the IEEE Vehicular Technology Conference, vol. 1, pp. 272-276.

Dewayne Hendricks, "Is there Part 15 Congestion? Part II," Sep. 27, 2000, FCC TAC.

FCC, "Report: Seconod Meeting of FCC Technological Advisory Council II," Nov. 28, 2001.

FCC, "Report: First Meeting of FCC Technological Advisory Council II," Aug. 26, 2001.

Stamatelos et al., "Spectral Efficiency and Optimal Base Placement for Indoor Wireless Networks," May 1996, IEEE Journal on Selected Areas in Communications.

Jon Peha, "Spectrum Management Policy Options," 1998, IEEE Communications Surveys, vol. 1, No. 1.

Stefan Pettersson, "Performance and Implementation Aspects of Wireless Indoor Communication Systems with Local Centralization," Apr. 2000, Dissertation submitted to the Royal Institute of Technology.

Mobilian Corporation, "Wi-Fi™ (802.11b) and Bluetooth™: An Examination of Coexistence Approaches," 2001. No Month Listed.

BBN Technologies, "Using Signal Processing to Analyze Wireless Data Traffic," May 22, 2002, BBN Technical Memorandum No. 1321.

ISCO International, "Interference Solutions: Improve Performance Realize New Traffic," Oct. 1, 2002, CDG Technology Forum.

Dewayne Hendricks, "Is there Part 15 Congestion?," Jun. 28, 2000, FCC TAC.

Ricardo Rodrigues et al., "On the Design and Capacity Planning of a Wireless Network," 2000, IEEE. No Month Listed.

Charles Jackson, "Distributed Channel Assignment: The Tragedy of the Commons, Oblers's Paradox, and Mad Cow Disease," Mar. 30, 2001, GWU ECE Colloquium.

Kevin Werbach, "Open Spectrum: The Paradise of the Commons," Nov. 20, 2001, Release 1.0, Ester Dysons Monthly Rept, vol. 19, No. 10.

Interlink Networks, "A Practical Approach to Identifying and Tracking Unauthorized 802.11 Cards and Access Points," 2002. No Month Listed.

Rodrigo Garces, "An Access Etiquette for Very-Wide Wireless Bands," Oct. 12, 1998, IEEE IC3N '98: Seventh International Conference on Computers.

K. Konston, "In Pursuit of A Wireless Bill of Rights," Sep. 18, 2002, Spectrum Management Working Group FCC-TAC, pp. 1-15.

Michael Yang et al., "On the Use of Unlicensed Frequency Spectrum, Use Rule Evolution, and Interference Mitigation," Jan. 18, 2001, Adaptive Broadband.

Jon M. Peha, "Wireless Communications and Coexistence for Smart Environments," Oct. 2000, IEEE Personal Communications.

Durga P. Satapathy et al., "Spectrum Sharing Without Licenses: Opportunities and Dangers," 1996, Proceedings of the Telecommunications Policy Research Conference. No Month Listed.

Xiaoxin Qui et al., "Network-Assisted Resource Management for Wireless Data Networks," Jul. 2001, IEEE Journal on Selected Areas of Communications, vol. 19, No. 7.

Durga P. Satapathy et al., "A Novel Co-existence Algorithm for Unlicensed Fixed Power Devices," Sep. 2000, IEEE Wireless Communications and Networking Conference.

PCT Search Report from PCT application No. PCT/US03/13563 filed Apr. 22, 2003.

SERVER AND MULTIPLE SENSOR SYSTEM FOR MONITORING ACTIVITY IN A SHARED RADIO FREQUENCY BAND

This application claims priority to the following U.S. Provisional Patent Applications:

U.S. Application Ser. No. 60/319,737, filed Nov. 27, 2002.
U.S. Application Ser. No. 60/469,647, filed May 12, 2003.
U.S. Application Ser. No. 60/502,947, filed Sep. 16, 2003.
U.S. Application Ser. No. 60/508,635, filed Oct. 3, 2003.
U.S. Application Ser. No. 60/508,636, filed Oct. 3, 2003.
U.S. Application Ser. No. 60/511,383, filed Oct. 15, 2003.

The entirety of each of these applications is incorporated herein by reference.

RELATED APPLICATIONS

The assignee of the present application has filed several applications related to the subject matter of the present application, the entirety of each of which is incorporated herein by reference.

1. Spectrum Management Patent Applications

Systems for managing activity in an unlicensed frequency band are described in the following applications:

U.S. application Ser. No. 10/246,363, filed Sep. 18, 2002, entitled "System and Method for Spectrum Management of a Shared Frequency Band."

U.S. application Ser. No. 10/420,515, filed Apr. 22, 2003, entitled "System and Method for Management of a Shared Frequency Band."

U.S. application Ser. No. 10/641,973, filed Aug. 15, 2003, entitled "System and Method for Management of a Shared Frequency Band Using Client-Specific Management Techniques."

2. Signal Classification Patent Applications

Techniques for classifying (identifying) signals occurring in a frequency band based on radio frequency (RF) information are disclosed in the following applications:

U.S. application Ser. No. 10/246,364, filed Sep. 18, 2002, and entitled "System and Method for Signal Classification of Signals in a Frequency Band."

U.S. application Ser. No. 10/420,362, filed Apr. 22, 2003, and entitled "System and Method for Classifying Signals Occurring in a Frequency Band."

U.S. application Ser. No. 10/628,603, filed Jul. 28, 2003, and entitled "System and Method for Classifying Signals Using Timing Templates, Power Templates and Other Techniques."

3. Real-Time Spectrum Analysis Patent Applications

A real-time spectrum analysis engine (SAGE) useful for generating the raw spectrum information that is used for signal classification and related functions is disclosed in the following applications:

U.S. application Ser. No. 10/246,365, filed Sep. 18, 2002, and entitled "System and Method for Real-Time Spectrum Analysis in a Communication Device."

U.S. application Ser. No. 10/420,511, filed Apr. 22, 2003, and entitled "System and Method for Real-Time Spectrum Analysis in a Radio Device."

4. Wireless Device Location Measurement Patent Application

Techniques for determining the location of wireless devices are disclosed in the following applications:

U.S. application Ser. No. 10/409,563, filed Apr. 8, 2003, entitled "System and Method for Locating Wireless Devices in an Unsynchronized Wireless Environment."

U.S. Application No. 60/469,647, filed May 12, 2003, and entitled "System and Method for Locating Sources of Unknown Wireless Radio Signals."

BACKGROUND OF THE INVENTION

The present invention relates to a system and method for managing a shared frequency band using a plurality of sensors positioned to capture information concerning activity in the shared frequency band.

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) will collapse. This phenomenon has already been observed in environments that have a high density of wireless devices.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. Thus, technology is needed to exploit all of the benefits of the unlicensed band without degrading the level of service that users expect.

Historically, the wireless industry's general approach to solving "tragedy of the commons" problems has been for manufacturers to simply move to another commons further up the spectrum. This solution, however, is not workable for much longer, due to spectrum scarcity and to the less attractive technical characteristics of the higher bands (decreased signal propagation and the inability to penetrate surfaces).

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on managing activity at the network level of the WLAN, but provide little or no capability to manage the frequency band where signals of multiple types (e.g., communication protocol/network types, device types, etc.) are present.

There are many shortcomings of existing WLAN system technologies. Current WLAN technologies are only generally aware of other network elements. They have no way to discover other nearby sources emitting RF signals in the unlicensed bands. The lack of device discovery and location functions exposes existing WLANs to significant security vulnerabilities. While current WLANs can perform standard authentication services and encryption services, they are vulnerable to imposter stations, denial-of-service attacks, parking lot attacks, and other security breaches.

SUMMARY OF THE INVENTION

Briefly, an intelligent spectrum management (ISM) system and method are provided that includes sophisticated features to detect, classify, and locate sources of RF activity. The system comprises one or more radio sensor devices positioned at various locations in a region where activity in a shared radio frequency band is occurring. A server is coupled to the radio sensor devices and aggregates the data generated by the sensor devices. Each radio sensor device comprises a spectrum monitoring section and a traffic monitoring section. The spectrum monitoring section comprises a radio receiver capable of receiving radio signals in a radio frequency band, a spectrum analysis system coupled to the radio receiver for generating spectrum (radio frequency) activity information representative of the (radio frequency) activity in the frequency band. The traffic monitoring section comprises a baseband signal processing section that demodulates signals transmitted by other devices on a wireless network in the frequency band according to the communication protocol and a radio receiver coupled to the baseband signal processing section that receives signals on the wireless network and couples received signals to the baseband signal processing section. A processor is coupled to the spectrum monitoring section and to the traffic monitoring section. The processor executes one or more programs to analyze packets transmitted by devices on the wireless network in the frequency band based on signals demodulated by the baseband signal processing section and to classify radio signals occurring in the frequency band based on the spectrum activity information output by the spectrum analysis system.

The server receives data from each of the plurality of sensor devices and executes functions to process the data. For example, the server executes a performance function that monitors and generates events related to the performance of the wireless network, a discovery function that monitors and generates events pertaining to devices operating in the wireless network or other radio frequency emitters in the frequency band and a security function that monitors and generates events related to security threats to the wireless network. In addition, the server interfaces data generated by its various functions to a client application, e.g., a network management application. The server is configurable by a network management application through an application programming interface (API) with respect to the type of information requested about activity in the wireless network and/or frequency band, and the server supplies aggregated data from the plurality of radio sensors to the network management application through the API.

The above and other advantages of this technique will become more apparent when reference is made to the following description taken in conjunction with the accompanying drawings.

DETAILED DESCRIPTION OF THE DRAWINGS

The system, methods, software and other technologies described herein are designed to cooperatively manage use of a shared frequency band where signals of multiple types occur (often simultaneously), such as an unlicensed band, and interference among the users of the band may occur. Many of the concepts described herein may apply to frequency bands that are not necessarily "unlicensed," such as when a licensed frequency band is used for secondary licensed or unlicensed purposes.

The term "network" is used hereinafter in many ways. There may be one or more wireless networks each comprising multiple devices or nodes that operate in the shared frequency band. One example of such a network is a WLAN. There are also networks, called piconets, which are formed with Bluetooth™ capable devices. Many of the examples described herein are made with respect to an IEEE 802.11 (also known as WiFi™) WLAN, mostly due in part to the expansive use that the WLAN has seen, and is expected to continue to see. In addition, the term network is referred to a wired network, and to an aggregation of one or more wired and wireless networks. The spectrum management systems, methods, software and device features described herein new are not limited to any particular wireless network, and are equally applicable to any wireless network technologies now known or hereinafter developed for use in a shared frequency band.

The Environment

Figure 1:
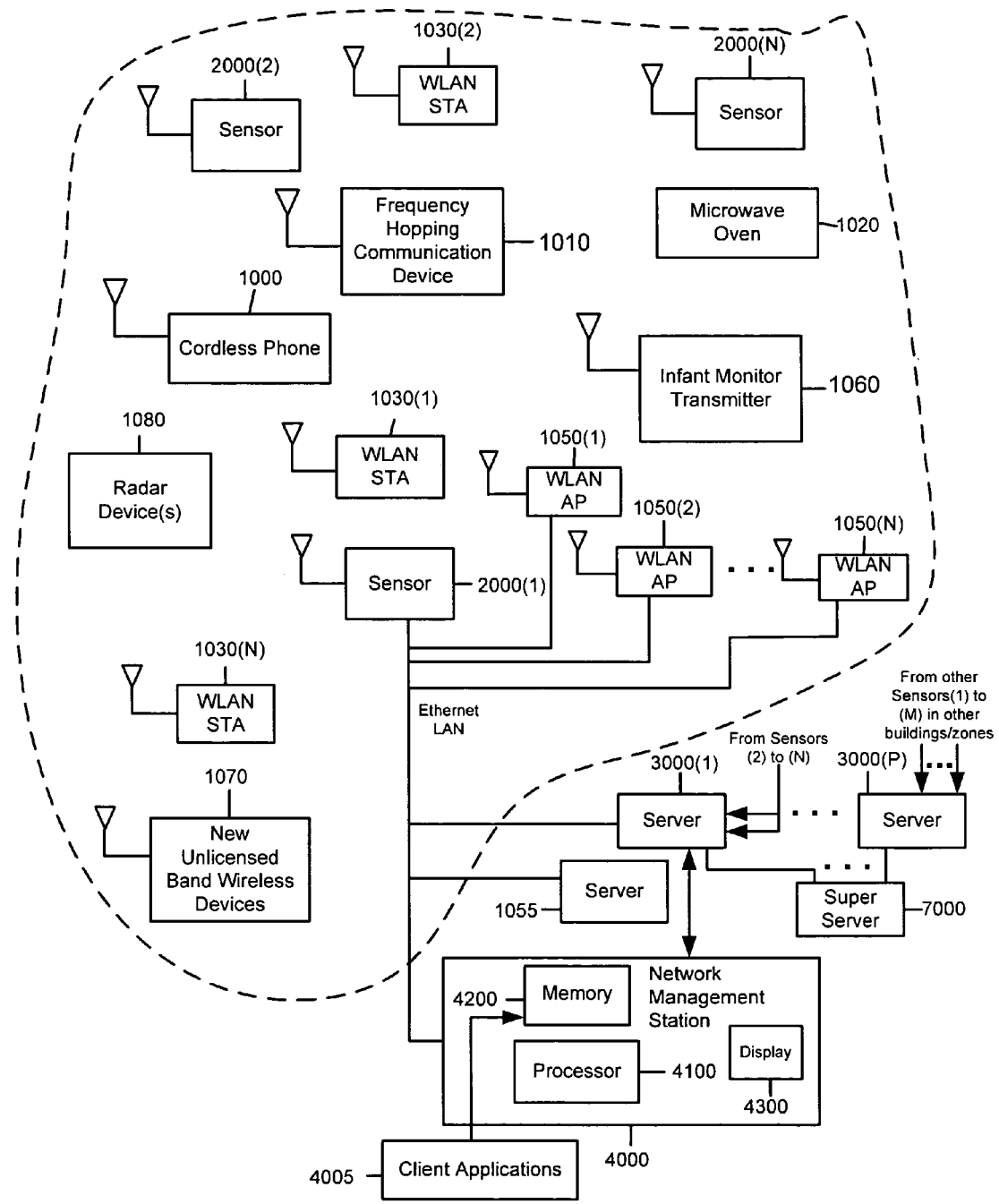
FIG. 1 is a block diagram of a spectrum management sensor system.

Referring first to FIG. 1, an environment is shown where there are multiple devices that at some point in their modes of operation transmit or emit signals within a common frequency band, and that may at least partially overlap in frequency and time. When these devices are sufficiently close in proximity to each other, or transmit signals at sufficiently high power levels, there will inevitably be interference between signals of one or more devices. The dotted-line shown in FIG. 1 is meant to indicate a region where activity from any of the devices shown may impact other devices. A region may be a building in which there are multiple zones of unlicensed band activity. The concept of zones is described further hereinafter. FIG. 1 shows a non-exhaustive exemplary selection of devices that may operate in an unlicensed frequency band, including cordless phones 1000, frequency hopping communication devices 1010, microwave ovens 1020, a wireless local area network (WLAN) comprised of a WLAN access point 1050(1) and its associated client station (STAs) 1030(1), 1030(2) to 1030(N), infant monitor devices 1060 as well as any other existing or new wireless devices 1070. Multiple WLAN APs 1050(1) to 1050(N) may be operating in the region, each of which has one or more associated client STAs 1030(1) to 1030(N).

One or more of the WLAN APs 1050(1) to 1050(N) may be connected to a wired network (e.g., Ethernet network) to which also connected is a server 1055. Cordless phones 1000 may be analog, digital and frequency hopping devices, depending on the type. Frequency hopping communication devices 1010 may include devices operating in accordance with the Bluetooth™ wireless communication protocol, the HomeRF™ wireless communication protocol, as well as cordless phones. In addition, radar devices 1080 may operate in an unlicensed frequency band. Other devices that may operate in the frequency band may also include appliances such as digital (still and/or) video cameras, cable-set top boxes, etc.

The spectrum management system described herein involves deployment of a plurality of sensors 2000(1) to 2000(N) shown in FIG. 1 in various locations or zones where activity associated with any of the plurality of signal types is occurring in the frequency band to form a sensor overlay network. The spectrum and protocol intelligence gathered by the spectrum sensors is fed to a server 3000. There may be multiple servers 3000(1) to 3000(P) each coupled to a plurality of sensors. A super server 7000 may connect to the plurality of servers 3000(1) to 3000(P) to manage each of the servers. There may be one server for each building or portion of a building, and the super server 7000 may manage the servers across a campus of buildings. For simplicity, a single server 3000 (corresponding to server 3000(1)) will be referred to in the following description. The server 3000 contains the aggregation and analysis software which processes low-level spectrum and protocol data from the sensors 2000(1) to 2000(N) and provides network level services described hereinafter. The sensors 2000(1) to 2000(N) are referred to as "agents" to the server 3000. A network management station 4000 executes one or more end-user client management applications 4005 or contains network management server software that requests services from the server. The network management station 4000 may include one or more processors 4100, memory 4200 and a display 4300. An example of an end-user management application is one that provides a console graphical user interface (GUI) to network engineers or IT managers. Some of the functions which may be performed by a network management server include WLAN management functions, such as (1) AP configuration, AP firmware upgrades, etc.; (2) security management such as authentication or virtual private network (VPN) management; and (3) management of other networks, such as a wired Ethernet network. The network management station 4000 is referred to as a "client" to the server 3000. The network management station 4000 may e part of a larger WLAN management infrastructure including servers and switches, which in turn, interfaces with a generalized (wired and wireless) network management infrastructure.

The Sensor

Figure 2:
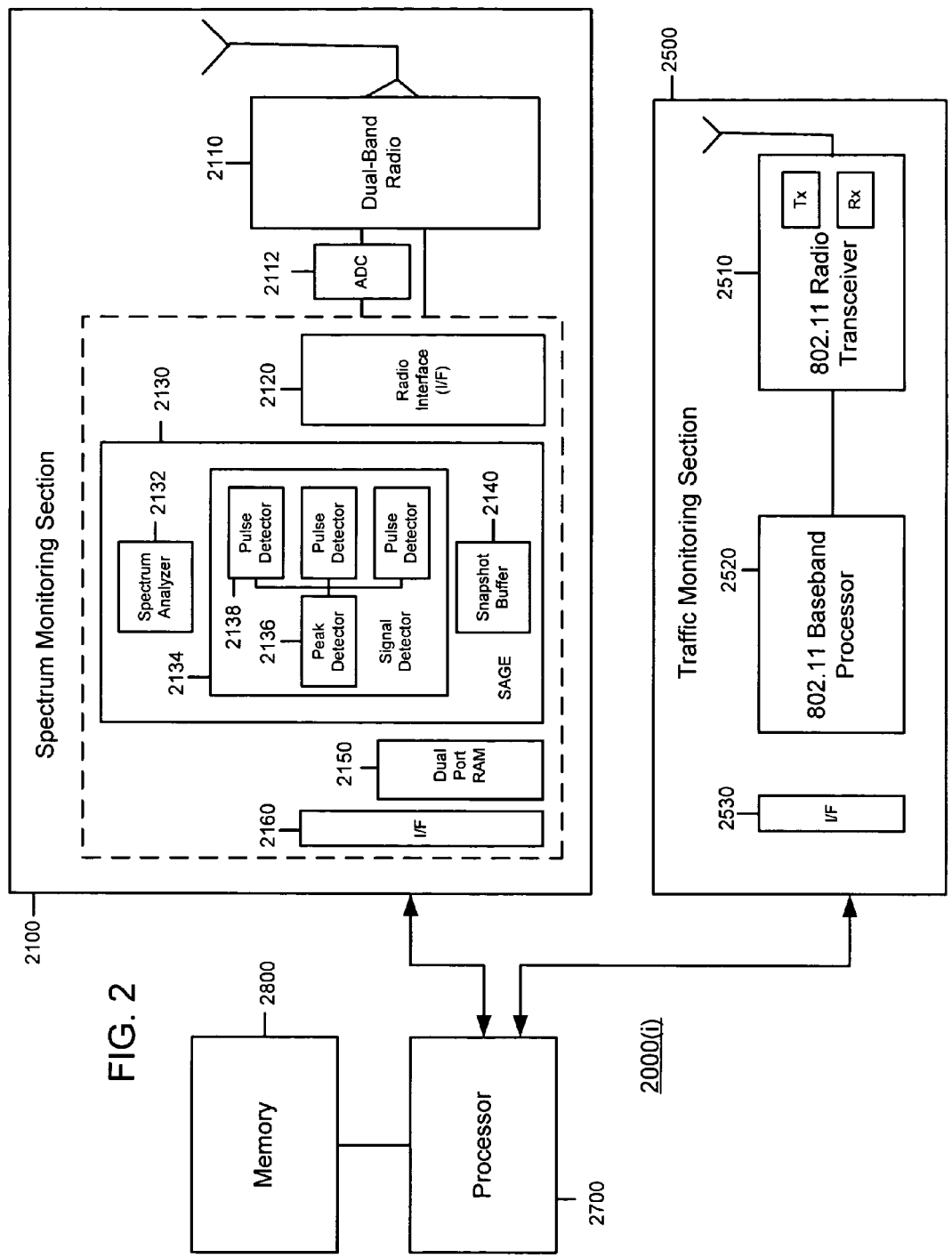
FIG. 2 is a block diagram of a sensor.

Turning now to FIG. 2, each sensor 2000($i$) comprises a spectrum monitoring 2100 section to monitor RF activity in the frequency band and a traffic monitoring section 2500 that is capable of sending and receiving traffic according to a communication protocol, such as an IEEE 802.11 WLAN protocol. The spectrum monitoring section 2100 comprises a radio 2110 (primarily for receive operations) that is capable of tuning to receive energy at each channel (or simultaneously all channels in a wideband mode) of, for example, any of the unlicensed bands (2.4 GHz and 5 GHz) in which IEEE 802.11 WLANs operate. An analog-to-digital converter (ADC) 2112 is coupled to the radio 2100 that converts the downconverted signals from the radio 2100 to digital signals. A radio interface (I/F) 2120 is coupled directly to the radio 2100 and also to the output of the ADC 2112. A spectrum analysis engine (SAGE) 2130 is coupled to the radio I/F 2120. The SAGE 2130 is thoroughly described in the aforementioned co-pending and commonly assigned patent applications, and includes a spectrum analyzer 2132, a signal detector 2134 consisting of a peak detector 2136 and one or more pulse detectors 2138, and a snapshot buffer 2140. A Fast Fourier Transform (FFT) block (not shown) is coupled between the I/F 2120 and the spectrum analyzer 2132, or included in the spectrum analyzer 2132. The SAGE 2130 generates spectrum activity information that is used in the sensor and the server to determine the types of signals occurring in the frequency band, and captures signals for location measurement operations. A dual port random access memory (RAM) 2150 is coupled to receive the output of the SAGE 2130 and a processor I/F 2160 interfaces data output by the SAGE 2130 to a processor 2700, and couples configuration information from the processor 2700 to the SAGE 2130.

The functions of the SAGE 2130 will be briefly described in further detail hereinafter. The spectrum analyzer 2132 generates data representing a real-time spectrogram of a bandwidth of radio frequency (RF) spectrum, such as, for example, up to 100 MHz. The spectrum analyzer 2132 may be used to monitor all activity in a frequency band, for example, the 2.4–2.483 GHz ISM band, or the 5.15–5.35 GHz and 5.725–5.825 GHz UNII bands. The FFT block referred to above is, for example, a 256 frequency bin FFT block that provides (I and Q) FFT data for each of 256 frequency bins that span the bandwidth of frequency band of interest. A spectrum correction block may be included to correct for I and Q channel imbalance by estimating an I-Q channel imbalance parameter related to phase error and amplitude offset between the I and Q channels, and to suppress a side tone resulting from the RF downconversion process. The spectrum analyzer 2132 may further comprise a power computation block that computes (FFTdataI)2 and (FFTdataQ)2, respectively, and adds them together, to output a power value for each FFT frequency bin. The spectrum analyzer 2132 may further include a stats logic block that has logic to accumulate statistics for power, duty cycle, maximum power and a peaks histogram. Statistics are accumulated in the dual-port RAM over successive FFT time intervals. After a certain number of FFT intervals, determined by a configurable value stored in the spectrum analyzer control registers, an interrupt is generated to output the stats from the dual-port RAM. For example, the stats are maintained in the dual-port RAM 2150 for 10,000 FFT intervals before the processor reads out the values. The power versus frequency data generated by the spectrum analyzer 2132 is also used as input to the signal detector.

The signal detector 2134 detects signal pulses in the frequency band and outputs pulse event information entries, which include one or more of the start time, duration, power, center frequency and bandwidth of each pulse that satisfies configurable pulse characteristic criteria associated with a corresponding pulse detector.

In the signal detector 2134, the peak detector 2136 looks for spectral peaks in the (power versus frequency data derived from FFT block output), and reports the bandwidth, center frequency and power for each detected peak. The output of the peak detector 2136 is one or more peaks and related information. The pulse detectors 2138 detect and characterize signal pulses based on input from the peak detector 2136.

The snapshot buffer 2140 collects a set of raw digital signal samples useful for signal classification and other purposes, such as time of arrival location measurements. The snapshot buffer 2140 can be triggered to begin sample collection from either the signal detector 2134 or from an external trigger source. The snapshot buffer 2140 can be triggered to begin sample collection from either the signal detector 2134 or from an external trigger source, such as a signal from the processor to capture received signal data for a period of time sufficient to include a series of signal exchanges used for location processing explained hereinafter. Alternatively, the snapshot buffer will be in a free-running state continuously storing captured and then in response to detecting the first signal (e.g., the Probe Request frame), the snapshot buffer is put into a post-store mode that extends long enough to capture the ACK frame signal data.

The traffic monitoring section 2500 monitors packet activity in wireless network, e.g., a WLAN, and sends and receives certain packets that are used for location measurement processes. For example, as described hereinafter, a sensor may transmit an 802.11 Probe Request frame, data frame or request-to-send frame that may be addressed to the device to be located. Included in the traffic monitoring section 2500 are a radio transceiver 2510 (comprising a transmitter Tx and a receiver Rx) and a baseband signal processor 2520. The radio transceiver 2510 and baseband signal processor 2520 may be part of a package chipset available on the market today, such as an 802.11 WLAN chipset for any one or more of the 802.11a/b/g or other WLAN communication standards. The baseband signal processor 2520 is capable of performing the baseband modulation, demodulation and other PHY layer functions compliant with the one or more communication standards of interest (e.g., IEEE 802.11a,b,g,h, etc.). An I/F 2530 couples the baseband signal processor 2520 and radio transceiver 2510 to the processor 2700.

There may be other traffic monitoring sections in the sensor to monitor communication protocol type activity of other types, such as Bluetooth™ communications.

The processor 2700 performs the various processing algorithms described herein on the output of the SAGE 2130 and on received packets from the traffic monitoring section 2500. The processor I/F 2160 of the spectrum monitoring section 2100 and the processor I/F 2530 of traffic monitoring section 2500 may be a Mini-PCI or PC-Card (e.g., Cardbus™) interface, or any other interface known in the art. While not shown in FIG. 2, there is also an LAN interface block (e.g., Ethernet) that is coupled to the processor 2700 to enable the sensor to communicate with the server with a wired LAN connection. The processor 2700 may generate signals to control the radio 2110 independently of the radio transceiver 2510, such that spectrum monitoring is occurring on one channel while protocol monitoring is simultaneously occurring on another channel, for example.

It is envisioned that a WLAN AP may include all of the functionality of a sensor described above, and may be switched between AP operating mode and a sensor operating mode.

The Client-Server-Sensor Architecture

Figure 3:
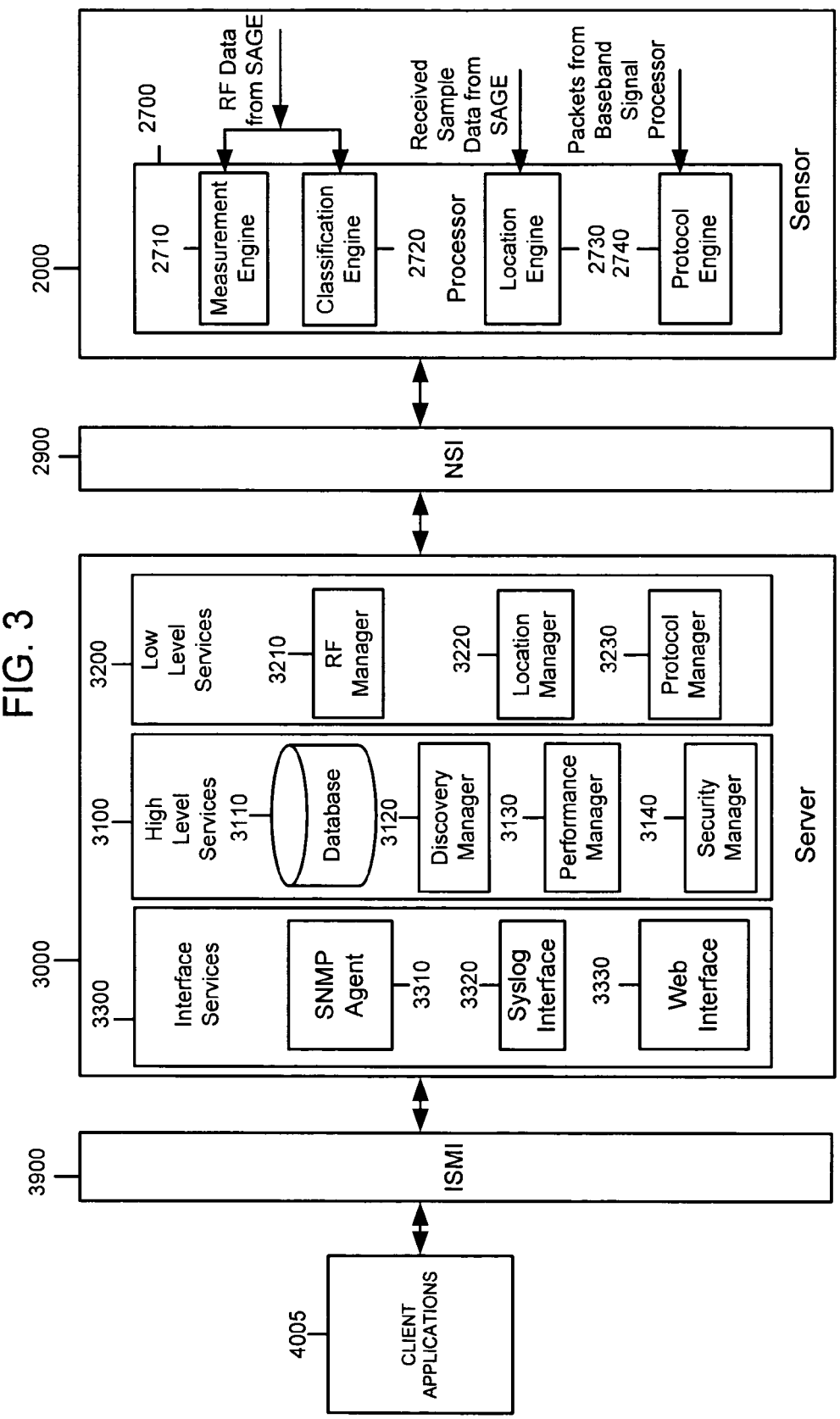
FIGS. 3 and 4 are functional block diagrams of the server and a sensor.

Turning to FIG. 3, a high level diagram is shown of the major functional blocks in the sensor 2000 and server 3000, as well as the interfaces between the sensor 2000 and server 3000, and between client applications 405 and the server 3000. In the sensor 2000, there are functions performed by the processor (executing one or more software programs) including a measurement engine 2710, a classification engine 2720, a location engine 2730 and a protocol engine 2740. The measurement engine 2710 and classification engine 2720 operate on RF data from the SAGE 2130. The location engine 2730 operates on raw received signal data obtained by the SAGE 2130 and the protocol engine 2740 operates on packet data generated by the baseband signal processor 2520.

The interface between the sensor 2000 and the server 3000 is referred to as a network spectrum interface (NSI) 2900. Examples of the messages that the sensor 2000 and server 3000 generate to implement the NSI 2900 are described in the aforementioned co-pending U.S. Application No. 60/508,635.

The server 3000 may run on a dedicated server box, or it may be integrated with other servers such as WLAN switches, authentication servers or management servers. The server consist primarily of an application that implements several services or functions described hereinafter. There are high level services 3100, low level services 3200, and interface services 3300. The high level services 3100 include a database 3110, discovery manager 3120, performance manager 3130 and security manager 3140. The low level services 3200 are invoked by one or more or the high level services 3100 and include an RF manager 3210, location manager 3220 and protocol manager 3230. The interface services 3300 include an SNMP agent 3310, a Syslog interface 3320 and a web interface 3300. The server 3000 interfaces with the client applications 4005 by an application programming interface (API) called the intelligent spectrum management interface (ISMI) 3900.

The functions provided by the server 3000 can be summarized as follows. The server manages all of the sensors it communicates with. It aggregates data from the sensors, performs analysis on the data and presents the data in formats amenable to other network management entities. The server software analyzes the raw data primarily on three axes:

Discovery: Determine the complete set of spectrum emitting devices (e.g., 802.11 wireless network APs and STAs, and other non-802.11 compliant emitters) that are present and track their physical location of devices.

Performance: Analyze the spectrum, protocol, and location data in order to detect and mitigate performance problems. Examples include network load problems, frequency retransmissions, interference and cold spots.

Security: Analyze the spectrum, protocol, and location data in order to detect and mitigate security issues. Examples include rogue APs, ad hoc networks, perimeter breaches, denial of service attacks (protocol and RF level) and movement of otherwise designated stationary assets.

Figure 4:
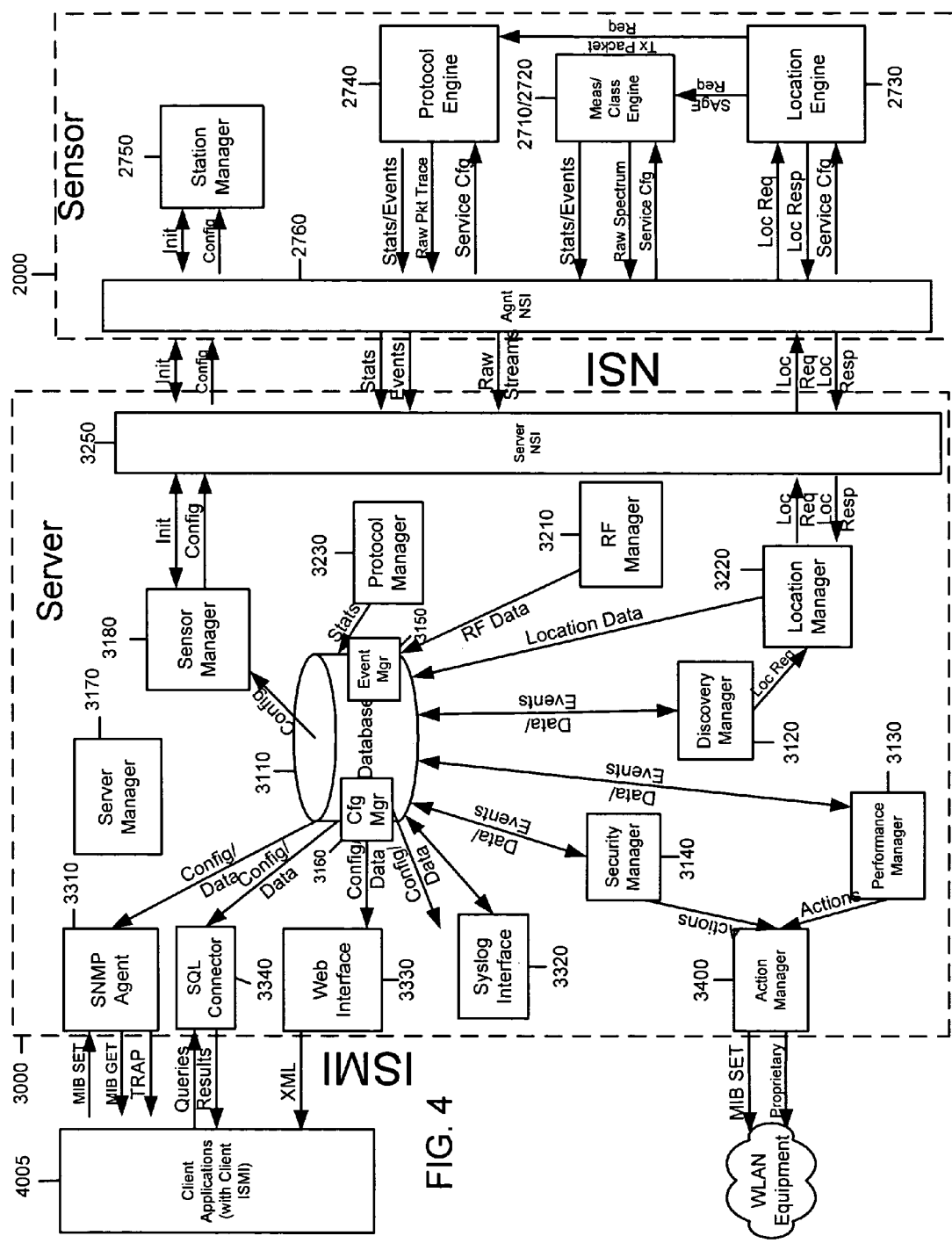

FIG. 4 illustrates the interaction between the server and the sensor in more detail, and the function of each of these blocks is described hereinafter. It should be understood that while only one sensor and one server are shown, a server 3000 communicates and aggregates data from one or several sensors 2000(1) to 2000(N).

The Sensor Software

Referring to FIG. 4 in conjunction with FIG. 5, the software functions of the sensor 2000 will be described in more detail. In addition to the measurement and classification engines 2710 and 2720, respectively, location engine 2730 and protocol engine 2740, the processor in the sensor also executes a station manager 2750 and an agent NSI 2760.

The measurement engine 2710 software in the sensor is responsible for communicating with the SAGE driver software to configure the SAGE 2130 in the sensor 2000. In addition, the measurement engine 2710 manages the resources of the SAGE 2130 between spectrum monitoring functions and device location functions. The measurement engine 2710 also collects and aggregates data from the SAGE 2130 into meaningful units. The functions of the measurement engine 2710 and classification engine 2720 may be incorporated into a single functional block. Furthermore, the measurement engine 2710 may configure reporting of data and statistics generated by the SAGE 2130 and adjust the frequency channel (and/or scan rate) on which the SAGE 2130 operates. The measurement engine 2710 may also operate the radio receiver in the sensor in a wideband mode to simultaneously process data across an entire unlicensed frequency band of interest.

The classification engine 2720 classifies/identifies signals occurring in the frequency based on the output of the SAGE 2130. Examples of signals that the classification engine 2720 may identify include Bluetooth™ signals, microwave oven signals, cordless telephones, wireless headsets, radar, etc. Techniques for signal classification are described in greater detail in the aforementioned commonly assigned and co-pending U.S. Patent Applications. The classification engine 2720 may generate events (at a configurable update rate) associated with identified signals and may further make a generalized "air quality analysis" of the frequency band given the type of signals determined to be occurring in the frequency band.

Examples of the statistics and events output by the measurement engine 2710 and classification engine 2720 are described hereinafter.

The location engine 2730 in the sensor is responsible for capturing raw received signal data used for time difference of arrival (TDOA) computations at the sensor. The location engine 2730 makes the TDOA computations and sends those computations to the server 3000 where the location computation is made based on multiple TDOA computations for a location process. In so doing, the location engine 2730 negotiates access to the snapshot buffer of the SAGE (to capture raw received signal data) by sending a request to the measurement engine 2710. The location engine 2730 initiates a location function in response to a Location Request (Loc Req) message from the server, and responds with the TDOA data in a Location Response (Loc Resp) message to the server. This process is described in more detail hereinafter.

The protocol engine 2740 captures information pertaining to packets transmitted over the air in accordance with a communication protocol, such as the IEEE 802.11 protocols. The baseband signal processor section of the sensor 2000 may operate in a "promiscuous mode" by which it can receive packets sent by any device on a particular 802.11 channel (but may not have access to the content of packets). In this manner, the sensor can develop statistics about the type of packets being sent, the volume of packet traffic, packet retransmissions, intruding APs or STAs, etc. Upon receiving a packet, the protocol engine 2740 collects statistics on the packet on a per channel, per device or per BSSID basis. Then, it applies a configurable (user-defined) filter to the packet for purposes of generating statistics. If the filter passes the packet it is sent to the server for further processing, otherwise it is bit bucketed. For example, the filter may be configurable with a Boolean expression of packet characteristics. Examples of the statistics and events output by the protocol engine 2740 are described hereinafter. The protocol engine 2740 is responsive to a service configuration (Config) message from the server to configure how to capture and report protocol information. In addition, the protocol engine 2740 performs functions to support location determination of other devices, such as scheduling the transmission of a reference packet that is used in TDOA location computations.

The protocol engine 2740 configures the process by which the sensor scans 802.11 channels to obtain packet information. The channel scan parameters may include channel selection, dwell time on the channel, hop pattern between channels, measurement intervals, etc.

Finally, the protocol engine 2740 configures criteria for protocol-based asynchronous alerts associated with network performance or security, or sensor operational conditions according to corresponding threshold based alarm criteria. Examples of techniques useful for protocol-based intrusion detection and address spoofing are described in the paper entitled "Layer 2 Analysis of WLAN Discovery Applications for Intrusion Detection," Joshua Wright, Nov. 18, 2002, and in the paper entitled "Detecting Wireless LAN MAC Address Spoofing," Joshua Wright, Jan. 21, 2003. These papers are available from the Internet using a suitable search engine, and their entirety is incorporated herein by reference.

The station manager 2750 software is responsible for storage and self-testing functions of the sensor. Specifically, the station manager provides persistent storage on a non-volatile memory of information pertaining to the individual sensor, including IP configuration, security keys used to authenticate the sensors to the server and vice-versa, sensor calibration data, software download information, and software version information.

The station manager 2750 also executes self-tests that are run when the sensor is powered on. Examples of functions or features that are tested include memory, chip detection, register read/write, LEDs, chip reset, interrupt tests and other board and chip level tests.

The agent NSI software 2780 manages the interface responsibilities for the sensor. It parses NSI messages received from the server to translate them into controls for one or more functions of the sensor, and generates messages containing data from one or more functions of the sensor. In addition, the agent NSI registers and de-registers software tasks for communication. A registering task can specify an interest in receiving events and from which sensor. Finally, the agent NSI supports the use of fixed compile time keys for authentication, or other more sophisticated security schemes.

Figure 5:
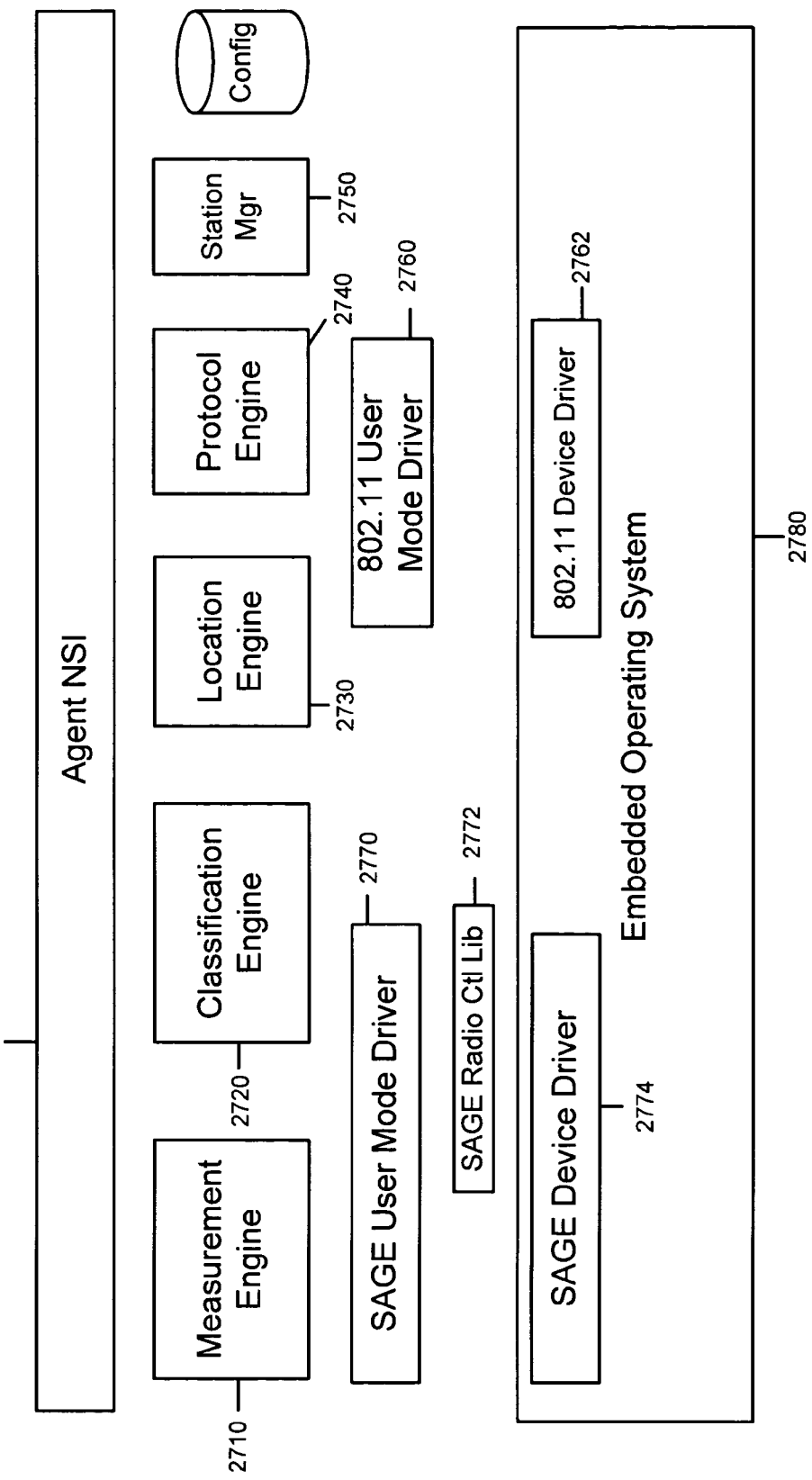
FIG. 5 is a software block diagram of a sensor.

FIG. 5 shows other software blocks in the sensor 2000. An 802.11 user mode driver 2760 and an 802.11 device driver 2762 communicate with the traffic monitoring section of the sensor 2000. The SAGE user mode driver 2770, the SAGE radio control library 2772 and the SAGE device driver 2774 communicate with the spectrum monitoring section of the sensor 2000. The drivers referred to herein may sit on an embedded operating system (OS) 2780. In addition, to support wired LAN connectivity, there is an Ethernet driver (not shown) that sits on the OS 2780 in a similar manner to the 802.11 drivers.

The Server Software

Similar to the agent NSI software, there is server NSI software 3250 in the server 3000 that is responsible for sending and receiving NSI messages, registering and de-registering software tasks including specifying which sensors the server is interested in receiving event information from as well as security support. The server NSI 3250 supports sensor management by notifying the sensor manager 3180 about the availability of sensors and the status of those sensors, e.g., sensor up/down type information. The server NSI 3250 also handles transport and socket management, and tasks related to setting up or tearing down the transport pipes, which may be socket-based. The server NSI 3250 supports requests from other server software (e.g. sensor manager) to open or close a connection to a sensor. The server NSI 3250 also processes a TCP connection, coming up or going down. The other server manager software functions that have registered to receive it are notified of this event. Alternatively, the down event may also be inferred from logic associated with activity over the transport pipe. The server NSI also configures discovery parameters for sensors (MAC address, port and interval).

The higher level services 3100 of the server 3000 will now be described.

The database 3110 provides physical storage of spectrum information, events, protocol information and related information generated by the sensors. In addition, the database 3110 maintains configuration information pertaining to the functions in the server 3000 and many functions in the sensors. A database schema is defined for the storage of this information, and is described hereinafter.

Discovery

The discovery manager 3120 in the server processes data pertaining to the discovery of new devices operating in the frequency band, such as 802.11 and other devices, and the physical location of those devices. Discovery involves handling reports from sensors concerning the up (and new) and down state of such devices. Also, multiple sensors may see the same 802.11 device coming up. The discovery manager 3120 detects suppresses the duplicate event. A discovery event associated with an 802.11 device may fall into one of the following classes: ours, known others, new and rogue. To this end, the discovery manager 3120 may maintain a list of authorized APs and STAs so that when a new device is detected by a sensor, the discovery manager 3120 can determine whether or not it is authorized. Alternatively, the security manager, described hereinafter, could be the software process that maintains the list of authorized devices and determines the status of newly discovered devices.

Similarly, the discovery manager 3120 also processes data pertaining to known and unknown interferers and handles associated events including up, down, new, and duplicate suppression. The sensors report on new known and unknown interferer devices. Also, multiple sensors may see the same known and unknown interferer device coming up and the discovery manager suppresses the duplicate event.

The discovery manager 3120 executes a scan policy. When a new device is discovered and is in the management domain of the server, a request is made to the location manager 3220 to determine the location of the device.

Finally, the discovery manager 3120 handles event-action association. Given an event (e.g., when a new AP comes up), the discovery manager 3120 initiates one or a series of actions (i.e., check whether the server should manage that device, and if so, locate it, etc.).

Performance

The performance manager 3130 manages performance issues concerning the operation of wireless networks under the domain of the server in the shared frequency band. One such function is called an "air quality" analysis. Based on the air/spectrum quality reports that the server receives from the sensors (as described above), the performance manager generates an air quality analysis that may indicate to the user overall network and spectrum air quality. The air quality rating is an index that is calculated based on the average level of RF energy in a channel, number of frequency hopper signals present, and other factors. The presence and strength of frequency hopping signals in the channel is given significant weight on the overall quality measure of the channel. An air quality report may consist of:

1. The center frequency of the channel being reported on.
2. An aggregate index of the RF air quality in this channel. For example, 0 may be the best, 100 is the worst. Values 0–33 indicates "EXCELLENT", 34–66 indicates "GOOD" and 67–100 indicates POOR.
3. The percentage of time that the power level for the channel remains above a configurable threshold.
4. Number of hops per second of one or more frequency hopping signals in the whole channel. '0' indicates no appreciable hops.
5. Average power of one or more frequency hopping signals, in dBm
6. The maximum power generated by any devices which are producing constant (i.e., non-hopping) interference.

The performance manager 3130 also sets a variety of thresholds which, if crossed, generates alarms. For example, an alarm may be generated if an AP has too many associated STAs, etc. The threshold cross alarms are described further hereinafter.

Security

The security manager 3140 in the server is responsible for managing security of one or more wireless networks operating in the frequency band under its domain. One type of security function is rogue AP detection. In rogue AP detection, a user can specify which APs are inside a security perimeter of the server and are authorized to operate in that security perimeter based on IP or MAC address. Sensors report the APs and STAs that they detect. The security manager 3140 processes these reports and determines whether an AP that is not authorized to operate inside the security perimeter has been detected. If so, then the security manager 3140 generates an alarm indicating the presence of a rogue AP. A sensor detects the presence of an AP. The security manager 3140 has the responsibility to declare the detected AP a rogue.

A client user can specify the parameters of the security perimeter. The security manager 3140 configures the security perimeter accordingly, which may be a polygon or volume region specified by the user. Inside this perimeter are the devices that the user wants to protect. The security manager 3140 may generate an alert when a device physically located outside the security perimeter accesses a WLAN that is located inside the security perimeter. Conversely, the security manager 3140 may generate an alert when a device physically located inside the security perimeter accesses or sends data to a device outside the security perimeter or associates with an AP outside the security perimeter. Moreover, a client user can give a particular device operating within the domain of the server a "fixed location attribute." The security manager 3140 detects whenever that "fixed location" device moves and reports it or generates an alert.

The security manager 3140 may also use trend information to detect "suspicious" protocol usage. A sequence of packets that meets certain filter characteristics might be deemed to be suspicious. For example, suspicious activity may be alerted when a sensor detects repeated attempts to associate with an AP using different MAC addresses. Alternatively, something more subtle that may be deemed suspicious is if a sensor detects packets from a particular STA that have non-sequential sequence numbers, potentially suggestive that a device user is masquerading as a particular STA. Another example is a probe packet that matches a signature of a well-known piece of hacker software such as NetStumbler. These types of activities need to be monitored at the sensor, since it requires examination of detailed packet traces. The security manager 3140 responds to suspicious protocol activity reports sent by sensors.

The low level services 3100 will now be described in more detail.

RF

The RF manager 3210 is responsible for aggregating and logging signal classification events from the classification engine 2720 in a sensor 2000, and for aggregating and logging spectrum statistics and raw spectrum information from the measurement engine 2710. The RF manager 3210 may also supply new or update existing classification templates or reference files to each sensor that the classification engine uses to classify RF signals.

Location

The location manager 3220 in the server handles the location processing to determine a location of a device operating in the frequency band. Location of a device (WLAN or interferer) can be a driving point for other analysis, particularly, security analysis. The location manager 3220 selects a group of sensors (e.g., 4 sensors) for a location measurement operation to locate a particular device. Each location operation usually needs several sensors working in concert. The location manager 3220 selects the subset sensors to be used in a location operation. Also, one of the sensors needs to be made a master, called the master reference terminal (MRT) sensor that transmits the reference signal used to solicit a response signal (second signal) from the device to be located or otherwise used as a reference with respect to the second signal transmitted by the device to be located. The other sensors, simply called reference terminals (RTs), capture the exchange of the first and second signals. An example of a location measurement process is disclosed in commonly assigned and co-pending U.S. application Ser. No. 10/409,563, filed Apr. 8, 2003 referred to above. The location manager 3220 dispatches location request messages to each of the sensors that are to be part of the location operation, and indicates in the message which sensor is the MRT. Each sensor generates TDOA information with respect to their respective receipt of the first and second signals and sends this information in a Loc Resp message to the location manager 3220. The location manager 3220 performs the final calculations from the TDOA information to compute the location of the device that is the subject of the location request. The location manager 3220 may have a configurable retry policy for a failed location operation. Location information may be generated in 2-dimensions or 3-dimensions, and displayed in either format as well.

The location manager 3220 also manages the scheduling of location requests, including the priority and the number of location requests that can be handled simultaneously. Any one sensor may be capable of handling a maximum number of location requests simultaneously. It may be desirable to assign priorities to a location request on a first come, first serve, or other basis.

The location manager 3220 caches location information and for example, indicates a "current as of x" type information associated with a computed location. Location information has a certain life span. The location manager 3220 may keep it current for a configurable period of time and then it is aged out and replaced with new location information.

The location manager 3220 may periodically execute a location process with certain sensors to determine the location of a particular device, e.g., a selected AP, and compare the measured location with a known location of the selected AP to verify that the sensors and server are performing the location operations correctly, and are operating within certain parameters.

Protocol

The protocol manager 3230 in the server is responsible for logging the captured packets by the various sensors into a log file for later processing. There may be a time sync difference between sensors. Different sensors come up (power up) at different times and do not have a concrete time of day concept. They have a notion of ticks with respect to which the server software needs to normalize. For example, sensor 1's tick 30 may represent the same instance of time as sensor 2's tick number 1000. The protocol manager software accounts for such skews.

The protocol manager 3230 may also provide aggregate packet statistic streams to a requesting client application. The protocol manager 3230 synchronizes the packet arrival from different sensors into a common time line. That is, packets captured at the same time in two different sensors may reach the server at a certain time skew. The protocol manager 3230 ensures that this time skew does not affect the packet traces. The protocol manager 3230 also detects when multiple sensors may see the same packet and report it to the server and remove the duplicate packet.

A set of filters may be used to configure background and real-time filtering of packets (as well as configuring the size of the background log) and are executed by the protocol manager 3230. Finally, the protocol manager 3230 converts protocol packet information into the appropriate format for transport via the ISMI 3900.

The sensor manager 3180 periodically polls the sensors to see if they are well and alive. In the event a sensor unexpectedly goes down, then during this keep alive polling process, the server determines when a sensor is not responding (for whatever reasons) and notes that sensor as "non-functional." The polling interval or frequency is configurable and the Sensor Manager manages this configuration.

The sensor manager 3180 performs a sensor discovery function by detecting when a sensor is coming up or going down. The server NSI provides the sensor manager 3180 with an indication about the sensor coming up or going down. The sensor manager 3180 then looks at the list of sensors that it has to manage and if that sensor is on the list, the sensor manager 3180 handles that event. In the event the sensor goes down, the sensor manager 3180 requests the server NSI 3250 to terminate the communication link with the sensor.

The sensor manager 3180 also sets up a connection with a sensor depending on whether the sensor coming up is in the server's domain or not. If the sensor coming up is in the server's domain (i.e., it has to be managed by the server) then the sensor manager 3180 requests the server NSI 3250 to set up a communication link with the sensor.

The sensor manager 3180 also has the responsibility of retrieving security keys for a sensor from the database and checking it against the key provided by the sensor. Only if they are identical should it allow the establishment of the communication link.

Finally, the sensor manager 3180 supports the configuration of topology information. This is the information about which sensors and device types the server manages.

The server manager 3170 is responsible for internal server management. For proper functioning of the server software, all the manager threads must be running and the server manager 3170 determines that the various manager software are operating properly. Server resources like CPU, memory are monitored and whenever it exceeds a pre-configured threshold, remedial actions are initiated. For example, if available memory becomes low, a garbage collection utility may be run to free up memory. In addition, the server manager 3170 performs an aging process that ages out old records in the database to free up memory in the event available memory becomes low.

The SNMP agent 3310 is responsible for SNMP related functions, such as SNMP user authentication, processing a database get request to retrieve the data from the database 3110 and returning it to the requesting entity. The SNMP agent 3310 performs trap support triggered by certain events. For example, in response to receiving an indication that a new sensor has come alive may cause the SNMP traps to be generated at the server. This will depend on the SNMP MIB definition.

All tasks associated with MIB management are handled by the SNMP agent 3310.

The SQL connector 3340 is responsible for publishing the database schema and controlling user access to the database. Some users may have read only access and others may have read and write access.

The web interface 3330 is responsible for the configuration interface for the overall system to allow a user to view and modify system configurations. In addition, the web interface 3330 processes some pertinent statistics and the results of that analysis are presented to the user in a report format. Finally, the web interface 3330 validates all configuration entries entered by a user. The web interface 3330 implements a server ISMI function and may support data in a variety of formats, including HTML or XML format.

The event manager 3150 receives events from sensors and dispatches the event information to other server software. Server managers register with the event manager 3150 to receive information on certain types of events.

The configuration manager 3160 pushes configurations to each sensor for initialization or configuration change. It also manages catastrophic event failure, scans policies of sensors and manages groups of 802.11 devices and sensors.

Now that the primary functions of the server 3000 have been described, set forth below is a list of the names of various tables in the database schema, followed by examples of the data structures for the tables. Many of these data structures are linked to each other as indicated. The fields in these data structures are similar to the data that the server makes available to a client application via the interface between the server and client applications described below. When the meaning of a field is obvious from its name, the description column indicates "self-evident."

| | |
|---|---|
| aqr_cfgs | aqr_cfgs_channels |
| aqr_stats | aqr_stats_channels |
| bssid_stats | channel_stats |
| classification_stats | configuration_classifications |
| configuration_entity_maps | configurations |
| database_cfgs | devices_80211 |
| entities | entity_classifications |
| entity_type_categories | entity_types |
| event_types | events |
| filter_cfgs | interferers |
| location_manager_cfgs | locations |
| monitoring_policy_cfgs | performance_manager_cfgs |
| radio_cfgs | radio_cfgs_bands |
| security_manager_cfgs | sensor_manager_cfgs |
| sensors | servers |
| smc_info_cfgs | station_stats |

TABLE

Air Quality Report Configurations (aqr_cfgs)

| F-Key | Name | Description |
|---|---|---|
| configurations.id | fk_cfg_id | PRIMARY KEY |
| | air_quality_update_ms | Air Quality Update Period (msec) |

Tables referencing this one via Foreign Key Constraints: aqr_cfgs_channels

TABLE

Air Quality Report Channel Configurations (aqr_cfgs_channels)

| F-Key | Name | Description |
|---|---|---|
| aqr_cfgs.fk_cfg_id | fk_aqrcfg_cfg_id | NOT NULL |
| | center_freq_mhz | Center frequency of channel for air quality report |
| | bandwidth_khz | Bandwidth of channel for air quality report |
| | air_quality_report_type_flags | See explanations below regarding types of air quality flags. |

TABLE

Air Quality Report Statistics (aqr_stats)

| F-Key | Name | Description |
|---|---|---|
| sensors.fk_ent_id | id | PRIMARY KEY |
| | fk_snsr_ent_id | |
| | rxtime | Timestamp without time zone information |

Tables referencing this one via Foreign Key Constraints: aqr_stats_channels

TABLE

Air Quality Report Statistics Per Channel (aqr_stats_channels)

| F-Key | Name | Description |
|---|---|---|
| aqr_stats.id | fk_aqrstat_id | PRIMARY KEY |
| | chan_center_freq_mhz | Center frequency of channel for AQI report |
| | quality_index | AQI measure |
| | duty_cycle_percent_x2 | Percentage of time that power level for the channel remains above a configurable threshold. |
| | hops_per_sec | Hops per sec for one or more frequency hopper signals detected in the channel |
| | avg_hop_power_dbm | Average power for frequency hop (for one or more frequency hopper signals detected in the channel) |
| | pwr_max_constant_ | Maximum power for a |

TABLE

BSSID Statistics (bssid_stats)
These records are unique for NSI frequency and beacon interval.

| F-Key | Name | Description |
|---|---|---|
|  | interferers_dbm | constant interferer |
|  | id | PRIMARY KEY |
| sensors.fk_ent_id | fk_snsr_ent_id | NOT NULL |
|  | rxtime | Timestamp without zone |
|  | nsi_frequency | Channel frequency in MHz |
|  | nsi_premap | Bitmap of Preambles used for Beacons |
|  | nsi_ratemap | Bitmap of Data Rates used for Beacons |
|  | nsi_nbeacon | Number of Beacons received |
|  | nsi_nantenna | Number of Beacons received over second sensor antenna |
|  | nsi_rssimin | RSSI: Minimum value |
|  | nsi_rssimax | RSSI: Maximum value |
|  | nsi_rssiave | RSSI: Used for Average - Sum of RSSI |
|  | nsi_rssistd | RSSI: Used for StdDev - Sum of RSSI$^2$ |
|  | nsi_nchange | Number of Beacons that changed unexpectedly |
|  | nsi_sqimin | Signal Quality Index (SQI): Minimum value |
|  | nsi_sqimax | SQI: Maximum value |
|  | nsi_sqiAve | SQI: Used for Average - Sum of SQI |
|  | nsi_sqiStd | SQI: Used for StdDev - Sum of SQI$^2$ |
|  | nsi_tbttMin | TBTT: Minimum value (Delta from nominal) |
|  | nsi_tbttMax | TBTT: Maximum value (Delta from nominal) |
|  | nsi_tbttAve | TBTT: Used for Average - Sum of Delta |
|  | nsi_tbttStd | TBTT: Used for StdDev - Sum of Delta$^2$ |
|  | nsi_TimeBeacon | Timestamp of last Beacon |

TABLE

Channel Statistics (channel_stats)

| F-Key | Name | Description |
|---|---|---|
|  | id | PRIMARY KEY |
| sensors.fk_ent_id | fk_snsr_ent_id | NOT NULL |
|  | rxtime | DEFAULT now( ) |
|  | nsi_frequency | Channel frequency in MHz |
|  | nsi_flag3 | Channel flags: Indicates that this is the last record for the current measurement interval. |
|  | nsi_monitor | Total time the channel was monitored (μsec) during the measurement interval. |
|  | nsi_toosmall nsi_toobig | The number of frames that were too small or too big during the measurement interval. All frames (CTS frames, Beacon frames, or a Probe Request frames) have a minimum size defined by the standard, and some have fixed sizes. If a frame is too small, it cannot be processed as some of the critical 802.11 fields are missing. TooSmall frames are dropped and can not be processed. For fixed sized frames (basically control frames), extra data can be ignored, and the frames are still processed, but the frame is suspect. |
|  | nsi_badcts nsi_badack | The number of CTS frames and the number of ACK frames received unexpectedly. It could be that they were actually sent without any request; an 802.11 g protection mechanism is in use; there was a legitimate request, but the sensor was unable to see it; or that there was a legitimate request, but the sensor hopped onto a channel in the middle of the exchange (i.e., not in time to see the request). In other words, unexpected CTS and ACK are not necessarily bad CTS or ACK. |
|  | nsi_unknownreq | The number of CTS frames and ACK frames that were considered bad because they were responses to unknown requesters, i.e., they are being sent to unknown stations. There |

TABLE-continued

Channel Statistics (channel_stats)

| F-Key | Name | Description |
|---|---|---|
| | | are several possible causes for this: <br> (1) The CTS or ACK may have been sent in legitimate response to an RTS or Data frame sent from a station that the Sensor has never received frames from - either because it is a hidden node or because the sensor has not yet discovered it. (In other words, the requestor exists, but the sensor and server are not aware of it.) <br> (2) The CTS or ACK could be sent to a station that really does not exist (indicating a probable protocol violation). |
| | nsi_latersp | The number of response (CTS/ACK) frames received late. Lateness is determined based on a fixed time interval. |
| | nsi_badtype <br> nsi_badver | Number of frames with reserved type or subtype, or reserved version. <br> The specification for 802.11 frame formats has an 802.11 Version field for which only 1 version is defined, and the other version numbers are reserved for future expansion. Similarly for the 802.11 Type and Subtype fields, there are reserved values, whose future use is to be determined. These two NSI fields (ReservedType and ReservedVersion in our messages) are counts of frames that have reserved formats, and so no other information can be assumed/implied. The reserved management frames are not counted here, but in rather the ReservedManagement counter in the measurement records per station. |
| | nsi_usecbad | Time used for unexpected frames (µSec) |
| | nsi_usecunkn | Time used for unknown frames (µSec) |

TABLE

Classification Statistics (classification_stats)

| F-Key | Name | Description |
|---|---|---|
| | Id | PRIMARY KEY |
| sensors.fk_ent_id | fk_snsr_ent_id | |
| | Rxtime | Timestamp without time zone |
| | device_on_id | Identifier number that stays the same for all events related to the turning ON of the device. That is, the "update" and "off" event messages for the same event will share the same device_ON_id. |
| | time_on_secs | Number of seconds the identified device has been on. |
| | timestamp_usecs | The time when the sensor recorded the event. |
| | class_id | General classification of the device (cordless phone, cordless headset, microwave, etc.). Maps to entity_type_category id value for interferers entity_classification. (not constrained) |
| | product_id | Specific product, when possible to identify (e.g., Brand Z Microwave, Model 7). Maps to entity_type id value for interferers entity_classification. (not constrained) |
| | alt_class_id | Alternate possible classification of the device. Maps to entity_type_category id value for interferers entity_classification. (not constrained) |
| | alt_product_id | Alternate possible product ID. Maps to entity_type id value for |

TABLE-continued

Classification Statistics (classification_stats)

| F-Key | Name | Description |
|---|---|---|
| | | interferers entity_classification. (not constrained) |
| | certainty_percentage | Estimated probability that the productID is correct. |
| | alt_certainty_percentage | Estimated probability that the alternate productID is correct. |
| | report_state | Device was just turned off. Device was just turned on. Updated on device status. |
| | min_pwr_dbm | Minimum power in dBm |
| | max_pwr_dbm | Maximum power in dBm |
| | avg_pwr_dbm | Self-evident |
| | std_deviation_pwr_dbm | Self-evident |
| | quality_index | Current overall air quality. A number from 0 to 100 indicating the quality of the entire band. 0 is the best, 100 is the worst. |
| | alert_level | Severe, Elevated, Guarded based on classified signal types |
| | detail_type | Hopper, non-hopper, continuous |
| | pulses_per_sec | identified hopper |
| | bandwidth_khz | identified hopper, non hopper, continuous |
| | min_pulse_duration_usecs | Data for identified hopper or non hopper |
| | max_pulse_duration_usecs | Data for identified hopper or non hopper |
| | avg_pulse_duration_usecs | Data for identified hopper or non hopper |
| | std_deviation_pulse_duration_usecs | Data for identified hopper or non hopper |
| | center_freq_khz | Data for identified non hopper or continuous signal |
| | duty_cycle_percentage | Data for identified continuous signal |

TABLE

Classification Configurations (configuration_classifications)

| F-Key | Name | Description |
|---|---|---|
| | id | PRIMARY KEY |
| | name | Name of classification configuration |
| | description | Description of configuration |

Tables referencing this one via Foreign Key Constraints: configurations

TABLE

Entity Maps Configurations (configuration_entity_maps)

| F-Key | Name | Description |
|---|---|---|
| configurations.id | fk_cfg_id | PRIMARY KEY |
| entities.id | fk_ent_id | PRIMARY KEY |

TABLE

Configurations (configurations)

| F-Key | Name | Description |
|---|---|---|
| | id | PRIMARY KEY |
| configuration_classifications.id | fk_cfgcls_id | |
| | name | Name of configuration |
| | description | Description of configuration |

Tables referencing this one via Foreign Key Constraints: aqr_cfgs, configuration_entity_maps, database_cfgs, filter_cfgs, location_manager_cfgs, monitoring_policy_cfgs, performance_manager_cfgs, radio_cfgs, security_manager_cfgs, sensor_manager_cfgs, smc_info_cfgs

TABLE

Database Configurations (database_cfgs)

| F-Key | Name | Description |
|---|---|---|
| configurations.id | fk_cfg_id | PRIMARY KEY |
| | archive_db | Self-evident |
| | archive_age_secs | Self-evident |

TABLE

802.11 Devices (devices_80211)

| F-Key | Name | Description |
|---|---|---|
| entities.id | fk_ent_id | PRIMARY KEY |
| | fk_enttyp_id | |
| | Channel | Channel of the device |
| | address_mac | MAC address |
| | Bssid | Self-evident |
| | discovered_flag | Self-evident |
| | Ssid | Self-evident |
| | operational_status | Self-evident |

TABLE

Entities (entities)

| F-Key | Name | Description |
|---|---|---|
|  | Id | PRIMARY KEY |
| entity_classifications.id | fk_entcls_id |  |
|  | Name | Entity name |
|  | description | Entity description |

Tables referencing this one via Foreign Key Constraints: configuration_entity_maps, devices_80211, events, interferers, locations, sensors, servers, statuses, users

TABLE

Entity Classifications (entity_classifications)

| F-Key | Name | Description |
|---|---|---|
|  | Id | PRIMARY KEY |
|  | Name | Name of entity classification |
|  | Description | Description of entity classification |

Tables referencing this one via Foreign Key Constraints: entities, entity_type_categories, entity_types

TABLE

Entity Type Categories (entity_type_categories)

| F-Key | Name | Description |
|---|---|---|
|  | Id | PRIMARY KEY |
|  | Name | Name of entity type category |
|  | Description | Description of entity type category |
|  | category_id | Category identifier |
| entity_classifications.id | fk_entcls_id |  |

Tables referencing this one via Foreign Key Constraints: entity_types

TABLE

Entity Types (entity_types)

| F-Key | Name | Description |
|---|---|---|
|  | Id | PRIMARY KEY |
|  | type_id | Entity type identifier |
| entity_classifications.id | fk_entcls_id |  |
| entity_type_categories.id | fk_entcat_id |  |
|  | Name | Name of entity type |
|  | description | Description of entity type |

TABLE

Event Types (event_types)

| F-Key | Name | Description |
|---|---|---|
|  | Code | PRIMARY KEY |
|  | Name | Name of event type |
|  | Severity | Severity of event type |
|  | Summary | Summary of event type |
|  | Description | Description of event type |
|  | Details | Details of event type |
|  | evttyp_map |  |

Tables referencing this one via Foreign Key Constraints: events

TABLE

Events (events)

| F-Key | Name | Description |
|---|---|---|
|  | Id | PRIMARY KEY |
| event_types.code | fk_evttyp_code |  |
| entities.id | fk_source_ent_id |  |
|  | Rxtime | Timestamp without time zone |
|  | xml_details |  |

TABLE

Filter Configurations (filter_cfgs)

| F-Key | Name | Description |
|---|---|---|
| configurations.id | fk_cfg_id | PRIMARY KEY |
|  | nsi_conf_id | This is used to correlate frame captures with this configuration. The value entered here will be echoed back as part of the data messages carrying frame information. The user should change the value of this NSI field in this message each time the configuration is changed. |
|  | nsi_flag2 | Capture Beacons, even if not matching |
|  | nsi_rate | The throttle rate for the filter, which is the limit on the frame capture bandwidth (not for all NSI traffic) in kilobits per second. In other words, this specifies the maximum rate in kbps that frame messages can be fed through the NSI. |
|  | nsi_filter | Compiled Frame Filter (variable sized) |

TABLE

Interferers (interferers)

| F-Key | Name | Description |
|---|---|---|
| entities.id | fk_ent_id | PRIMARY KEY |
| sensors.fk_ent_id | fk_snsr_ent_id |  |
|  | device_on_id | Interferer device identifier |
|  | detail_type | Interferer type details |
|  | class_id | Classification identifier |
|  | product_id | Product type identifier |
|  | certainty_percentage | Confidence of classification |
|  | alt_class_id | Alternative classification identifier |
|  | alt_product_id | Alternative product identifier |
|  | alt_certainty_percentage | Confidence of alternative classification |

TABLE

Location Manager Configurations (location_manager_cfgs)

| F-Key | Name | Description |
|---|---|---|
| configurations.id | fk_cfg_id | PRIMARY KEY |
|  | cycle_time |  |
|  | location_enable | Flag to enable location process |
|  | request_spacing_time | Minimum time intervals between |

TABLE-continued

Location Manager Configurations (location_manager_cfgs)

| F-Key | Name | Description |
|---|---|---|
|  | flush_80211_on_startup | servicing location requests |
|  | ap_timeout | Time interval to consider AP has not responded to location process |
|  | station_timeout | Time interval to consider STA has not responded to location process |
|  | Interferer_timeout | Time interval to consider interferer has not responded to location process |
|  | scan_time |  |

TABLE

Locations (locations)

| F-Key | Name | Description |
|---|---|---|
|  | Id | PRIMARY KEY |
|  | X | x-coordinate |

TABLE-continued

Locations (locations)

| F-Key | Name | Description |
|---|---|---|
|  | Y | y-coordinate |
|  | Z | z-coordinate |
|  | measuretime | Timestamp without zone |
| entities.id | fk_ent_id |  |
| sensors.fk_ent_id | fk_mrt_snsr_ent_id | Identifier of MRT sensor associated with location data |
| sensors.fk_ent_id | fk_rt1_snsr_ent_id | Identifier of RT1 sensor |
| sensors.fk_ent_id | fk_rt2_snsr_ent_id | Identifier of RT2 sensor |
| sensors.fk_ent_id | fk_rt3_snsr_ent_id | Identifier or RT3 sensor |

TABLE

Monitoring Policy Configurations (monitoring_policy_cfgs)

| F-Key | Name | Description |
|---|---|---|
| configurations.id | fk_cfg_id | PRIMARY KEY |

The fields for the monitoring policy configurations data structure are the same as the fields for the Sensor Protocol Measurement Configuration, described below.

TABLE

Performance Manager Configurations (performance_manager_cfgs)
See the Performance Manager Configurations hereinafter for descriptions of some of these fields.

| F-Key | Name | Description |
|---|---|---|
| configurations.id | fk_cfg_id | PRIMARY KEY |
|  | update_interval | Time interval at which performance parameters are updated |
|  | cochannel_interference_enabled | Flag to indicate whether to look for and generate events on detection of co-channel interference. |
|  | ap_fault_enable | Flag to indicate whether to look for and generate events on detection of a previously approved AP that is no longer sending beacons. |
|  | data_rates_enabled | Monitor data rates. |
|  | rate_1_mbps_enabled | See description below for Performance Configuration |
|  | rate_2_mbps_enabled |  |
|  | rate_5_5_mbps_enabled |  |
|  | rate_6_mbps_enabled |  |
|  | rate_9_mbps_enabled |  |
|  | rate_11_mbps_enabled |  |
|  | rate_12_mbps_enabled |  |
|  | rate_18_mbps_enabled |  |
|  | rate_24_mbps_enabled |  |
|  | rate_36_mbps_enabled |  |
|  | rate_48_mbps_enabled |  |
|  | rate_54_mbps_enabled |  |
|  | aqi_enabled | AQI enable |
|  | aqi_lo_threshold | AQI low threshold |
|  | aqi_hi_threshold | AQI high threshold |
|  | aqi_duty_cycle_enabled | AQI duty cycle enable |
|  | aqi_duty_cycle_lo_threshold | AQI duty cycle low threshold |
|  | aqi_duty_cycle_hi_threshold | AQI duty cycle high threshold |

TABLE-continued

Performance Manager Configurations (performance_manager_cfgs)
See the Performance Manager Configurations hereinafter for descriptions of some of these fields.

| F-Key | Name | Description |
|---|---|---|
| | channel_utilization_enabled | Channel utilization monitoring enable |
| | channel_utilization_lo_threshold | Channel utilization low threshold |
| | channel_utilization_hi_threshold | Channel utilization high threshold |
| | retries_enabled | Retries monitoring enabled |
| | retries_lo_threshold | Retries low threshold |
| | retries_hi_threshold | Retries high threshold |
| | stations_enabled | Stations monitoring enabled |
| | stations_lo_threshold | Stations low threshold |
| | stations_hi_threshold | Stations high threshold |
| | probes_enabled | Probe Request monitoring enabled |
| | probes_lo_threshold | Probe Request low threshold |
| | probes_hi_threshold | Probe Request high threshold |

TABLE

Radio Configurations (radio_cfgs)

| F-Key | Name | Description |
|---|---|---|
| configurations.id | fk_cfg_id | PRIMARY KEY |
| | ms_between_channel_change | Time between channel changes |

Tables referencing this one via Foreign Key Constraints:
radio_cfgs_bands

TABLE

Radio Frequency Band Configurations (radio_cfgs_bands)

| F-Key | Name | Description |
|---|---|---|
| radio_cfgs.fk_cfg_id | fk_radcfg_id | NOT NULL |
| | start_freq_mhz | Start frequency of band |
| | end_freq_mhz | End frequency of band |
| | logical_channel_size_khz | Channel size in the band |

TABLE

Security Manager Configurations (security_manager_cfgs)

| F-Key | Name | Description |
|---|---|---|
| configurations.id | fk_cfg_id | PRIMARY KEY |
| | rogue_ap_enable | Rogue AP detection enable flag |
| | ibss_enable | IBSS monitoring enabled |
| | unencrypted_enable | Unencrypted packet monitoring enabled |
| | num_mgmt_frames_enable | Number of management frames monitoring enabled |
| | num_mgmt_frames_lo_threshold | Low threshold for number of management frames |
| | num_mgmt_frames_hi_threshold | High threshold for number of management frames |
| | aqi_enable | AQI enabled |
| | aqi_lo_threshold | AQI low threshold |
| | aqi_high_threshold | AQI high threshold |
| | perimeter_enable | Perimeter attack enabled |
| | perimeter | Perimeter descriptor |

TABLE

Sensor Manager Configurations (sensor_manager_cfgs)

| F-Key | Name | Description |
|---|---|---|
| configurations.id | fk_cfg_id | PRIMARY KEY |
| | enable_keepalive | Keep alive enabled |
| | keepalives_per_sec | Number of keep alives per sec configuration |

TABLE

Sensors (sensors)

| F-Key | Name | Description |
|---|---|---|
| entities.id | Fk_ent_id | PRIMARY KEY |
| servers.fk_ent_id | Fk_srvr_ent_id | |
| | status | Status of the sensor from sensors' point of view |
| | state | Status of the sensor from the server's point of view |
| | mac_address | MAC address of the sensor |
| | Ip_address | IP address of the sensor |
| | connection_time | Time duration that sensor has been connected to server |
| | Enabled | Sensor enabled |
| | enable_locationing | Location using that sensor enabled |
| | dynamic_ip | |
| | x | x-coordinate of sensor |
| | y | y-coordinate of sensor |
| | z | z-coordinate of sensor |
| | enable_smc | Enable measurement and classification |
| | enable_protocol | Enable protocol monitoring |
| | uptime | |
| | location_mac_address | |
| | keepalive | |
| | keepalive_timeout | |
| | peer_ip_address | |
| | conn_retry_count | |
| | conn_retry_interval | |

Tables referencing this one via Foreign Key Constraints: aqr_stats, bssid_stats, channel_stats, classification_stats, interferers, locations, station_stats

TABLE

Servers (servers)

| F-Key | Name | Description |
|---|---|---|
| entities.id | fk_ent_id | PRIMARY KEY |
| | status | |
| | last_uptime | Self-evident |
| | last_downtime | Self-evident |
| | ip_address | Self-evident |

Tables referencing this one via Foreign Key Constraints: sensors

TABLE

Measurement/Classifcation Engine Stream Configurations (smc_info_cfgs) Some of these fields are described in the Spectrum Stream Configurations described hereinafter.

| F-Key | Name | Description |
|---|---|---|
| configurations.id | fk_cfg_id | PRIMARY KEY |
| | sapf_samples_per_sec | |
| | num_sapf_bins | |
| | sa_stats_samples_per_sec | |
| | pwr_thresh_dbm | |
| | num_sa_stats_bins | |
| | pevt_enable_flag | |
| | phist_update_ms | |
| | air_quality_update_ms | Milliseconds between Air Quality updates |
| | classify_update_secs | Seconds between classification updates |
| | classify_enable_flag | Flag to enable signal classification |
| | classify_flags | Flags associated with types of signals to be classified |

TABLE

Station Statistics (station_stats)

| F-Key | Name | Description |
|---|---|---|
| | Id | PRIMARY KEY |
| sensors.fk_ent_id | fk_snsr_ent_id | NOT NULL |
| | rxtime | Timestamp without zone |
| | nsi_frequency | Frequency channel of the STA |
| | nsi_ta | Transmitter address |
| | nsi_ra | Receiver address. All multicast addresses are mapped to broadcast addresses. This means that instead of creating a possibly large number of multicast records for each AP, we instead treat all multicast addresses as the broadcast address and so only create one entry. |
| | nsi_flag4 | Station flags. Indicates that this is the last record for the current measurement interval or that the BSSID changed during this measurement interval (for IBSS). |
| | nsi_premap | Bitmap indicating which type(s) of modulation were used in data and management frames among 802.11b Short Preamble (DSSS or CCK), 802.11b Long Preamble (DSSS or CCK) and 802.11 a/g OFDM Preamble. |
| | nsi_ratemap | Bitmap for data rates for data and management frames. |
| | nsi_nantenna | Number of frames received over second antenna |
| | nsi_lenave | Sum of the length all data and management frames in bytes, including retries. (Control frames are not counted.) Useful to compute the average length of these frames in bytes. |
| | nsi_lenmin | The minimum length for any of the data and management frames (control frames and other frames are not included). |
| | nsi_rssimin nsi_rssimax | The minimum and maximum values of the Received Signal Strength Indicator. The range of values will depend on the NIC card in use by the sensor. |
| | nsi_rssiave | Sum of RSSI for data, management, PS Poll, CF End, and ACK frames to calculate the average RSSI. |
| | nsi_rssistd | Sum of $RSSI^2$ to compute standard deviation. |
| | nsi_lenmax | The maximum length for any of the data and management frames (control frames and other frames are not included). |
| | nsi_sqimin nsi_sqimax | The minimum and maximum values of the Signal Quality Indicator (can range from 0 to 15). |
| | nsi_sqiave | Average SQI. |

The foregoing is an example of a database scheme that is useful to manage configuration information for server and sensor functions and data collected from the sensors. The database 3110 populates the various database table structures with data collected from the sensors.

In addition to reporting events, the performance and security manager may initiate various actions to mitigate the impact of current RF conditions. For example, in response to a high level of interference on a given channel, the performance manager could configure 802.11 APs in the vicinity of the interference to operate on other channels.

To perform these type of responses, the performance and security manager make use of an action manager 3400. The action manager 3400 comprises logic to interface to the various types of wireless equipment that may be operating in the network. For example, some APs could be configured via an SNMP interface, some might be configured via a HTML interface, and some might use a proprietary interface. The action manager 3400 hides the details of these interfaces from the performance and security manager. Other actions may include changing the packet fragmentation threshold, assigning a device to a different frequency sub-band or channel in the frequency band, network load balancing (on the basis of channel frequencies or time), adjusting the transmit power of the AP, adjusting the communication data rate, executing interference mitigation or co-existence algorithms, executing spectrum etiquette procedures, executing spectrum priority schemes, or re-assigning STAs to APs in a WLAN. Examples of interference mitigation algorithms are disclosed in commonly assigned and co-pending U.S. Patent Publication No. 20020061031, published, May 23, 2002, and in U.S. application Ser. No. 10/248,434, filed Jan. 20, 2003, and entitled "Systems and Methods for Interference Mitigation with Respect to Periodic Interferers in Short-Range Wireless Applications."

Figure 6:
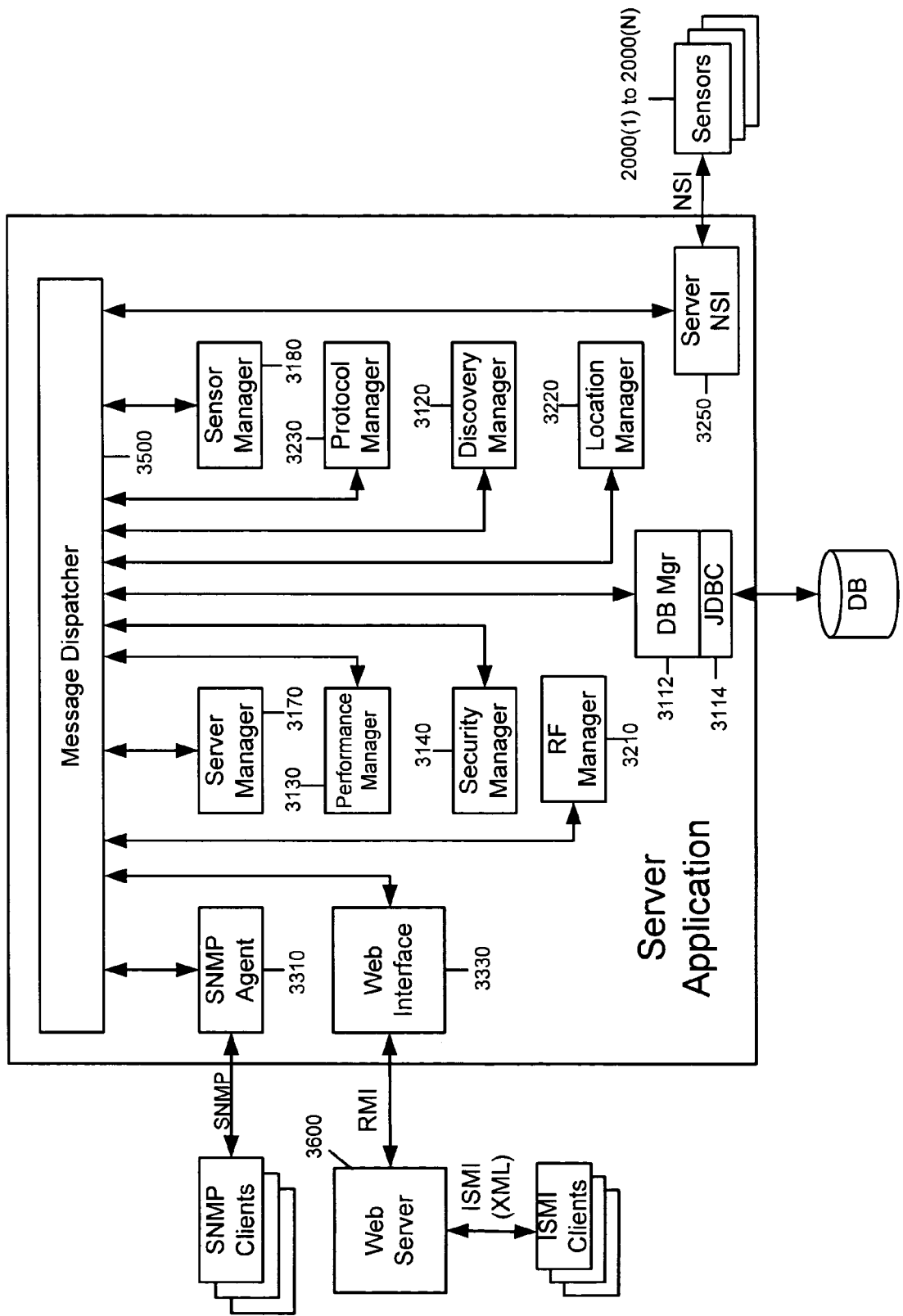
FIG. 6 is a software block diagram of the server.

FIG. 6 illustrates the interaction of some of the server applications in more detail. The server applications executes the functions described above in connection with FIGS. 4 and 5 and further include a message dispatcher 3500, a database manager 3112 and a Java database connectivity block (JDBC) 3114. Incoming spectrum and traffic/protocol data from the sensors is coupled to the message dispatcher

3500 that coordinates delivery of the data to the appropriate one of the other application services and to the database manager 3112 for registration and storage in the database. The web interface 3330 coordinates exchange of information with a web server 3600. The SNMP agent 3310 coordinates exchange of information with the various SNMP clients. The web server 3600 executes a server ISMI function to exchange controls and data with the various ISMI clients referred to above.

The ISMI

Whereas the NSI is used to interface control and information between the server and the sensors, the ISMI is an API that interfaces control and information between the server and the outside world, e.g., client users at a network management station, as well as to generate controls generated by the action manager 3400 to make adjustments to WLAN equipment based on activity determined to be occurring in the frequency band. The server implements a server ISMI (API) function (referred to above) to receive configurations from a client network management application and supplies data concerning activity in the wireless network and frequency band according to the configurations received from the client network management application. Conversely, a client application implements a client ISMI (API) function to supply configurations concerning the type of information requested about activity in the wireless network and frequency band, and receives from the server ISMI function data concerning activity in the wireless network and frequency band according to the configurations. Examples of the configurations supplied by the client ISMI function to the server ISMI function, and of the data supplied by the server ISMI function to the client ISMI function are described in the tables below.

The ISMI may support several data transports, such as streaming socket-based, Web, XML, SNMP, SQL Connector. It provides access to and configuration of raw streams for protocol, spectrum and location data; and periodic measurement data for protocol, spectrum and location data. In addition, it provides an interface for processed event streams, such as discovery events, performance events and security events.

Examples of the ISMI configurations and data are set forth in the following tables. Much of this information is redundant to the information stored in the database of the server.

Server Configuration

The client is able to read and update the server configuration, which may include the following fields.

| Field Name | Description and Notes |
| --- | --- |
| IP Address | IP Address of the server. |
| Host Name | Host name of the server. |
| Description | A text description of the server. |
| DB Max Age in Days | Maximum # days to keep data in the database. For example, if set to 28 then data older than 4 weeks will be dropped from the database. |

Server Status

The client is able to read the server status, which may include the following fields:

| Field Name | Description and Notes |
| --- | --- |
| Uptime (seconds) | How long the server has been operational, measured in seconds. |
| System Operational State | Top-level status of system operation: 0 = OK, 1 = warning, 2 = error |
| Interference State | Top-level status of RF interference level: 0 = OK, 1 = warning, 2 = error |
| Performance State | Top-level status of RE performance level: 0 = OK, 1 = warning, 2 = error |
| Security State | Top-level status of RF security level: 0 = OK, 1 = warning, 2 = error |

Sites and Zones

The server 3000 can support multiple sites each of which may be monitored by a set of sensors. A site has a defined zero location point. An example of a site would be a building. Within each site, a number of zones may be defined. A zone is marked by a physical perimeter, bounded by a set of location vertices which define a 3-space polyhedron, for example.

Site Data

For each site, the client can read and update the following site configuration and status information.

| Field Name | Description and Notes |
| --- | --- |
| Site ID | Unique entity ID for site. |
| Description | Description of site: ex. "Building 21" |
| Interference State | Site-level status of RF interference level: 0 = OK, 1 = warning, 2 = error. Read-only. |
| Performance State | Site-level status of RF performance level: 0 = OK, 1 = warning, 2 = error. Read-only. |
| Security State | Site-level status of RF security level: 0 = OK, 1 = warning, 2 = error. Read-only. |

Zone Data

For each zone, the client can read and update the following zone configuration and status information.

| Field Name | Description and Notes |
| --- | --- |
| Zone ID | Unique entity ID for zone. |
| Description | Description of zone: ex. "1st floor lobby" |
| Perimeter X, Y, Z | Defines an N-point perimeter polyhedron for the zone. Specified in units of feet from a zero reference point. |
| Interference State | Zone-level status of RF interference level: 0 = OK, 1 = warning, 2 = error. Read-only. |
| Performance State | Zone-level status of RF performance level: 0 = OK, 1 = warning, 2 = error. Read-only. |
| Security State | Zone-level status of RF security level: 0 = OK, 1 = warning, 2 = error. Read-only. |

The client is able to request a list of existing sensors. The client may also create a new sensor entry and enable it, in order to expedite set-up of new sensors.

General Sensor Configuration

For each sensor, the client can read and update the following sensor configurations.

| Field Name | Description and Notes |
| --- | --- |
| Sensor ID | Unique entity ID for sensor. |
| Site ID | Entity ID of the Site which this sensor monitors. |
| MAC Address | Ethernet MAC Address of the sensor. Read-only except during creation of a sensor record. |
| Dynamic IP | Flag to indicate whether DHCP should be used to assign an IP address to the sensor. |
| IP Address | IP Address of the sensor. If Dynamic IP is in use, then this is a read-only field. |
| Name | Short text name of the sensor. |
| Description | Detailed description of the sensor. |
| Fault code | In the case of a sensor fault, contains the last fault code. Read-only, except to clear the value. |
| HW Version | Sensor Hardware version information. Read-only. |
| SW Version | Sensor Software version information. Read-only. |
| NSI Min | Earliest revision of the NSI supported by the sensor. Read-only. |
| NSI Max | Latest revision of the NSI supported by the sensor. Read-only. |
| Enabled | Flag to indicate whether the sensor is globally enabled |
| Status | Flags reflecting the server view of the sensor status: connected, fault, idle, ... Read-only. |

Sensor Location Measurement Configuration

For each sensor, the client can read and update the following sensor location measurement configuration.

| Field Name | Description and Notes |
| --- | --- |
| Enable location | Flag to indicate whether the sensor can be used for location. |
| Location X, Y, Z | Physical location of the sensor, measured in feet for a zero reference point for the site. |

Sensor Spectrum Measurement and Classification Configuration

For each sensor, the client can read and update the following sensor spectrum measurement and classification (SMC) configuration.

| Field Name | Description and Notes |
| --- | --- |
| Enable SMC | Flag to indicate whether spectrum sensing is enabled. |
| Raw Spectrum Sense | Flag to indicate whether raw spectrum tracing is urrently in progress. Read-only. |
| AirQualityUpdateMilliSec | Milliseconds between Air Quality updates. '0' indicates no Air Quality messages. |
| EventUpdateSecs | Seconds between Event updates. '0' indicates no Event messages. |
| Enable Events | Flag to indicate whether spectrum events are enabled. |
| EventClassifyFlags | Flags to determine what kinds of RF devices/events to classify. |

Sensor Protocol Measurement Configuration

For each sensor, the client can read and update the following sensor protocol measurement configuration.

| Field Name | Description and Notes |
| --- | --- |
| Enable Protocol | Flag to indicate whether protocol sensing is enabled. |
| Raw Protocol Sense | Flag to indicate whether raw protocol sensing is currently in progress. Read-only. |
| Monitoring Mode | Per Channel Monitoring Mode: Enables collection of data on a per-channel basis.<br>Per Station Monitoring Mode: Enables collection of data on a per-station basis. (This is actually per pair-of-stations basis, where a pair can be either a station or an AP, or for ad hoc networks a station and another station.)<br>Per SSID Monitoring Mode: Enables collection of data for a group of stations and APs that are part of a single SSID. Could be used to collect data based on some other field identifier in a packet.<br>A normal operating mode would be to enable all three measurements at the same time. |
| DwellTimeInactive Channels | The dwell time is the amount of time that the agent spends monitoring a channel (when the channel is being tuned to), before moving on to another channel. The time is measured in milliseconds. There are two parameters, one for the time spent dwelling in inactive channels, and one for the time spent dwelling in active channels. The hopping logic keeps tuning through a generated list of channels. All the active channels are always included in this generated list (so they are monitored regularly). |
| DwellTimeActiveChannels | The MinimumMonitorTimeForActiveChannels (see two fields down) limits how often inactive channels are included (so they are monitored less frequently), |

-continued

| Field Name | Description and Notes |
| --- | --- |
| | so that an appropriate percentage of the time is spent on the active channels. Possible values: DwellTimeInactiveChannels: 120 (msec) DwellTimeActiveChannels: 1020 (msec) |
| ActiveChannelOnTime | This parameter is used to determine which channels should be considered active. Any channel that has a frame transmitted on it in the last ActiveChannelOnTime seconds is defined to be active. However, not all frames are considered; for example, when a station is scanning (searching for an AP to associate with), its probe requests frames are sent on a channel that is inactive. Possible value: 120 (seconds) |
| MinimumMonitorTimeFor ActiveChannels | This is the minimum amount of time, by percent, that a the sensor must spend monitoring active channels. If necessary, this value overrides the DwellTimeInactiveChannels parameter. Possible value: 90 (percent) |
| MeasurementInterval | This is the duration (in seconds) of each measurement period for 802.11 protocol data. During this time interval, the sensor is continuously measuring packets and channels (except for short times tuning the radio). All measurements over that period (which can include a large number of hops between channels) are reported. The next interval starts immediately, without any gaps. Possible value: 60 (seconds) |
| FrequencyList | Variable-sized list of monitored Channels (MHz) Note: Center frequencies not supported by hardware, or beyond the maximum supported by software are silently ignored. Possible values: 2412, 2417, 2422, 2427, 2432, 2437, 2442, 2447, 2452, 2457, 2462 (MHz) |

Discovery Configuration

The client can read and update the following discovery configuration parameters.

| Field Name | Description and Notes |
| --- | --- |
| 802.11 Location Refresh | Location refresh rate for 802.11 devices, in seconds. |
| 802.11 Debounce Time | Time to consider an 802.11 device active, after it has no longer been seen, in seconds. |
| Interferer Location Refresh | Location refresh rate for interference devices, in seconds. |
| Interferer Debounce Time | Time to consider an interference device active, after it has no longer been seen, in seconds. |

Discovered Devices

The client is able to request a list of current or historical devices. If desired, the list can be qualified by the following filters:

| Filter Type | Filter Value |
| --- | --- |
| Band | 2.4 GHz or 5 GHz |
| 802.11 Type | AP, STA, IBSS |
| Interferer Type | Static, Frequency Hopping |
| Device ID | Unique entity ID for a specific device |
| Site ID | Entity ID for a specific site |
| Zone ID | Entity ID for a specific zone |
| Start Time, End Time | Start and End timestamps for historical data |

For each device, the client can read and update the following device parameters.

| Field Name | Description and Notes |
| --- | --- |
| Device ID | Unique entity ID for device. Read-only. |
| Site ID | Entity ID for site in which device was found. |
| Zone ID | Entity ID for zone in which device was found. |
| Name | Short text name of the device. |
| Description | Detailed description of the device. |
| Band | 2.4 GHz or 5 GHz. Read-only. |
| Type | 802.11 or Interferer. Read-only. |
| Time Discovered | Time that the device was first discovered. Read-only. |
| Time Gone | Time that the device was determined to be no longer present (for historical entries). Read-only. |
| Discovering Sensors | List of IDs of the sensors which discovered the device. Read-only. |
| Stationary | Flag which can be set by the ISMI client to indicate that the device is stationary, and that movement of the device should generate a security event. |

The following additional location information is available. Note that in addition to current location, historical location records may be retrieved for a device:

| Field Name | Description and Notes |
| --- | --- |
| Timestamp | Time that the location operation was performed on the device. |
| Location X, Y, Z | Physical location of the device, measured in feet from a zero reference point for the site. Read-only. |

For 802.11 devices, the following additional information may be available:

| Field Name | Description and Notes |
| --- | --- |
| 802.11 MAC Address | MAC address of the device. Read-only. |
| 802.11 Device Type | AP, STA, IBSS. Read-only. |
| Frequency | Channel Frequency, in MHz. Read-only. |
| For 802.11 STAs | |
| Associated AP | For STAs, the gentility ID of the AP to which the STA is associated. Read-only. |
| For 802.11 APs | |
| SSID | For APs, the SSID. Read-only. |

For interference devices, the following additional information may be available:

| Field Name | Description and Notes |
| --- | --- |
| Class Type | General classification of the device (Bluetooth, Cordless Phone, Microwave, Etc.) |
| Product Type | Specific Product, when possible to identify (Ex. Brand Z Microwave, Model 7) |
| Certainty | Estimated probability (in percentage) that the Class and Product Types are correct. |
| Alt Class Type | Alternate possible classification of the device. |
| Alt Product Type | Alternate possible product type of the device. |
| Alt Certainty | Estimate probability (in percentage) that the Alt Class and Product Types are correct. |
| Min Power | Minimum power in dBm (across all discovering sensors). Read-only. |
| Max Power | Max power in dBm (across all discovering sensors). Read-only. |
| Average Power | Average power in dBm (across all discovering sensors). Read-only. |
| Type | Frequency Hopper, Non-hopper, Continuous |

For frequency hopping interference devices, the following read-only detail information may be available:

| Field Name | Description and Notes |
| --- | --- |
| Pulses Per Second | Number of hops per second. |
| Pulse Bandwidth | Bandwidth of individual hops, in KHz. |
| Min Pulse Duration | Minimum duration of pulses, in microseconds. |
| Max Pulse Duration | Maximum duration of pulses, in microseconds. |
| Average Pulse Duration | Average duration of pulses, in microseconds. |
| Std-Dev Pulse Duration | Std-deviation (from 0) of the pulse durations, in microseconds. |

For non-hopping interference devices, the following detail information may be available:

| Field Name | Description and Notes |
| --- | --- |
| Center Frequency | Center frequency of pulses. |
| Pulse Bandwidth | Bandwidth of individual pulses, in KHz. |
| Min Pulse Duration | Minimum duration of pulses, in microseconds. |
| Max Pulse Duration | Maximum duration of pulses, in microseconds. |
| Average Pulse Duration | Average duration of pulses, in microseconds. |
| Std-Dev Pulse Duration | Std-deviation (from 0) of the pulse durations, in microseconds. |

For continuous interference devices, the following read-only detail information is available:

| Field Name | Description and Notes |
| --- | --- |
| Center Frequency | Center frequency of pulses. |
| Pulse Bandwidth | Bandwidth of individual pulses, in KHz. |
| Duty Cycle | Percentage of time the RF energy remains above the configured value. |

The performance manager 3130 is responsible for generating alerts when 802.11 network performance has been or may be adversely affected.

Performance Configuration

The client can read and update the following performance configuration parameters.

| Field Name | Description and Notes |
| --- | --- |
| Co-channel Enabled | Flag to indicate whether to look for and generate events on detection of co-channel interference. |
| AP Fault Notification | Flag to indicate whether to look for and generate events on detection of a previously approved AP that is no longer sending beacons. |
| Low Data Rate | Flag to indicate whether to look for and generate events on detection of undesirable data rates. |
| Low Data Rate Map | Bitmap for data rates that are considered too low. The following are the bit definitions: PRT_RATE_1 11b 1.0 Mbps<br>PRT_RATE_2 11b 2.0 Mbps/DSSS QPSK<br>PRT_RATE_5 11b 5.5 Mbps/CCK<br>PRT_RATE_11 11b 11.0 Mbps/CCK<br>PRT_RATE_6 11a 6.0 Mbps/OFDM BPSK<br>PRT_RATE_9 11a 9.0 Mbps/OFDM BPSK<br>PRT_RATE_12 11a 12.0 Mbps/OFDM QPSK<br>PRT_RATE_18 11a 18.0 Mbps/OFDM QPSK<br>PRT_RATE_24 11a 24.0 Mbps/OFDM 16QAM<br>PRT_RATE_36 11a 36.0 Mbps/OFDM 16QAM<br>PRT_RATE_48 11a 48.0 Mbps/OFDM 64QAM<br>PRT_RATE_54 11a 54.0 Mbps/OFDM 64QAM |
| TCA Enabled | Flag to indicate whether to look for and generate events on threshold crossing alarms. |

The client can configure threshold levels for various statistics that will result in generation of threshold crossing alarms (TCA) events. Simple thresholds may be set on individual statistics. For example, AQI<25. In addition, complex thresholds may be set on combinations of statistics using Boolean rules. For example: AQI<25 AND Max Power>20.

SAGE thresholds can be set using the following statistics for a channel:

| Statistic | Description and Notes |
| --- | --- |
| AQI | Air Quality Index Measure: 0–100 |
| Duty Cycle | Percentage of time (×2) that the power level for the channel remains above a configurable threshold. |

-continued

| Statistic | Description and Notes |
|---|---|
| Average Power | Average power in dBm |
| Max Power | Max power in dBm |
| Pulse Count | Number of pulses seen in channel per measurement interval. |
| Number of Interferers | Number of interferers affecting this channel. |

802.11 thresholds can be set using the following statistics for a channel, SSID, or STA:

| Statistic | Description and Notes |
|---|---|
| Percent Channel Used | Percentage of time (×2) that the channel is utilized. |
| Percent Retries | Percentage of packets which were retries. |
| Average Data Rate | Average Data Rate (in Mbytes/sec) |
| Number of Users | Number of active nodes (STA and AP) |
| Number of Probes | Number of probe messages sent over the last measurement interval. |

The security manager 3140 is responsible for generating alerts when 802.11 network security has been or may be adversely affected.

Security Configuration

The client can read and update the following security configuration parameters.

| Field Name | Description and Notes |
|---|---|
| Perimeter Attack 802.11 | Flag to indicate whether the security manager should look for and generate events on Perimeter Attacks by 802.11 devices. |
| Perimeter Attack RF | Flag to indicate whether the security manager should look for and generate events on Perimeter Attacks by non-802.11 devices. |
| Authorized AP List | List of MAC address of all authorized AP devices. |
| Rogue AP | Flag to indicate whether the security manager should look for and generate events on discovery of Rogue APs (i.e. APs not in the authorized list). |
| Soft AP | Flag to indicate whether the security manager should look for and generate events on discovery of Soft APs. A Soft AP is a STA configured by software to act as an AP. |
| IBSS | Flag to indicate whether the security manager should look for and generate events on discovery of an IBSS. |
| Unencrypted Link | Flag to indicate whether the security manager should look for and generate events on discovery of an Unencrypted link. |
| Advertised SSID | Flag to indicate whether the security manager should look for and generate events on discovery of an advertised SSID. |
| Protocol Break-in | Flag to indicate whether the security manager should look for and generate events on discovery of a protocol level break-in attempt. Ex. Signature detection of Netstumbler or other hacking tool. |
| 802.11 Denial of Service(DoS) | Flag to indicate whether the security manager should look for and generate events on discovery of a protocol level Denial of Service attack. Ex. Hacker sending out disassociation requests. |
| RF DoS | Flag to indicate whether the security manager should look for and generate events on discovery of an RF level Denial of Service attack. An RF level Denial of Service attack may be characterized by a substantially constantly ON signal with across a relatively wide bandwidth, or other signal with unusual spectrum and time domain characteristics. |
| RF DoS Bandwidth | Minimum Bandwidth (in KHz) of a constant interferer which will cause it to be characterized as a potential DoS attack. |
| RF DoS Power | Minimum power level (in dBm) of a constant interferer which will cause it to be characterized as a potential DoS attack. |

The server 3000 generates an event stream which provides a high-level view of the operation of the system. The client is able to set a filter view for events, find the start and end index of available events, and retrieve a set of events.

Event filters provide a mechanism for the client to receive only events that are of interest, while ignoring other events. Event filters may also be used to examine historical data for recurrences of specific events.

The client can read and update the following event filter parameters:

| Field Name | Description and Notes |
|---|---|
| Severity Level | Valid levels are: High, Medium, Low |
| Type Flags | Flags to indicate the type of event. Multiple flags may be set on a given event. |
| Site ID | Entity ID for a specific Site |
| Zone ID | Entity ID for a specific Zone |

The following event type flags are defined:

| Type Flags | Description and Notes |
|---|---|
| Discovery | Event is related to the discovery of a new device. |
| Performance | Event is performance related, for ex. a TCA. |
| Security | Event is security related, for example, a Perimeter violation. |
| 802.11 | Event is 802.11 related. |
| RF | Event is non-802.11 related. |
| Location | Event is related to the location of a device. |
| System | System event, such as a sensor or server failure. |

Events

An event has the following fields:

| Field Name | Description and Notes |
|---|---|
| ID | Unique index |
| Code | The event type code (see below for a list of event codes) |
| Timestamp | A timestamp that the event occurred. |
| Sensor List | Entity IDs of sensors which participated in the event. |
| Parameters | Name-value pair parameter list for the event. For example, an "AP Up" event would have parameter giving the channel, SSID, and MAC Address of the AP. |
| Site ID | Entity ID for the site in which the event occurred. |
| Zone ID | Entity ID for the zone in which the event occurred. |

| Field Name | Description and Notes |
|---|---|
| Type Flags | Flags to indicate the type of event. Multiple flags may be set on a given event. |
| Severity | High, Medium, Low |

Event Configuration

The following is a default list of events and their configurations. The client can read and update the event configuration to change the type flags, severity, or store in database attributes of a particular event.

Discovery Events:

| Event Name | Type Flags | Severity | Store in DB | Parameters |
|---|---|---|---|---|
| 802.11 STA Up | Discovery, 802.11 | Low | Yes | Channel, MAC Address, AP |
| 802.11 STA Inactive | Discovery, 802.11 | Low | Yes | Channel, MAC Address, AP |
| 802.11 AP Up | Discovery, 802.11 | High | Yes | Channel, MAC Address, SSID |
| 802.11 AP Down | Discovery, 802.11 | High | Yes | Channel, MAC Address, SSID |
| Interferer Up | Discovery, RF | Med | Yes | Class, Product, Certainty, Min/max/avg power |
| Interferer Inactive | Discovery, RF | Med | Yes | Class, Product, Certainty, Min/max/avg power |

Security Events:

| Event Name | Type Flags | Severity | Store in DB | Parameters |
|---|---|---|---|---|
| Rogue AP Detected | Security, 802.11 | High | Yes | Channel, MAC Address, SSID |
| IBSS Detected | Security, 802.11 | High | Yes | Channel, # STAs |
| Soft AP Detected | Security, 802.11 | High | Yes | Channel, MAC Address, SSID |
| Unencrypted Link | Security, 802.11 | High | Yes | Channel, MAC Address, SSID |
| Advertised SSID | Security, 802.11 | High | Yes | Channel, MAC Address, SSID |
| 802.11 Perimeter Attack | Security, 802.11, Location | High | Yes | Channel, MAC Address |
| RF Perimeter Attack | Security, RF, Location | High | Yes | Center Freq, Bandwidth, Power |
| RF DoS Attack | Security, RF | High | Yes | Center Freq, Bandwidth, Power |
| 802.11 Dos Attack | Security, 802.11 | High | Yes | AP, Attack Type |
| 802.11 Break-in Attack | Security, 802.11 | High | Yes | AP, Attack Type |

Performance Events:

| Event Name | Type Flags | Severity | Store in DB | Parameters |
|---|---|---|---|---|
| Co-channel Interference | Perf, 802.11 | Med | Yes | Channel, # of APs |
| AP Fault | Perf, 802.11 | High | Yes | Channel, MAC Address, SSID |
| Low Data Rates | Perf, 802.11 | Med | Yes | Channel, SSID, Data Rates |
| TCA: AQI | Perf, RF | Med | Yes | Channel, Level |
| TCA: Duty Cycle | Perf, RF | Med | Yes | Channel, Level |
| TCA: Average Power | Perf, RF | Med | Yes | Channel, Level |
| TCA: Max Power | Perf, RF | Med | Yes | Channel, Level |
| TCA: Pulse Count | Perf, RF | Med | Yes | Channel, Level |
| TCA: # Interferers | Perf, RF | High | Yes | Channel, Level |
| TCA: % Channel Used | Perf, 802.11 | Med | Yes | Channel, SSID, Level |
| TCA: Percent Retries | Perf, 802.11 | High | Yes | Channel, SSID, Level |
| TCA: Avg Data Rate | Perf, 802.11 | Med | Yes | Channel, SSID, Level |
| TCA: Number of Users | Perf, 802.11 | Med | Yes | Channel, SSID, Level |

The following system events are defined:

| Event Name | Type Flags | Severity | Store in DB | Parameters |
|---|---|---|---|---|
| Sensor Up | System | High | Yes | Sensor ID |
| Sensor Down | System | High | Yes | Sensor ID |
| Sensor Fault | System | High | Yes | Sensor ID, Fault Code |
| Server Restart | System | High | Yes | |
| Server Fault | System | High | Yes | Fault Code |

The server 3000 stores historical statistics data in a database. The client can query these statistics for presentation to users, or for post-analysis. The ISMI can set qualifiers for statistics, find the start and end time of available statistics data, and may retrieve a set of statistic data. For a set of statistic data, the client can specify the interval (start time, end time), and number of data points. For example, a client could query for the average AQI over the last week, with 50 data points.

Statistic Qualifiers

Statistic qualifiers enable the client to focus on a specific area of interest, for example a particular channel or location.

The client can read and update the following statistic qualifier parameters:

| Field Name | Description and Notes |
|---|---|
| Site ID | Entity ID for a particular Site |
| Zone ID | Entity ID for a particular Zone. |
| Sensor | Entity ID for a particular sensor |
| Channel | 802.11 channel indicator |
| Location X, Y, Z | Center Location point (measured in feet from a zero reference point for the site) |
| Location Radius | Radius of location area (measured in feet) |
| Device | Entity ID for a particular device |
| AP | Entity ID for a particular AP (and it's associated stations) |

Statistic Data

The client can query data for the following statistics.

RF Statistics:

These statistics may be qualified by channel and sensor.

| Statistic | Description and Notes |
| --- | --- |
| AQI | Air Quality Index Measure: 0–100 |
| Duty Cycle | Percentage of time (×2) that the power level for the channel remains above a configurable threshold. |
| Average Power | Average power in dBm |
| Max Power | Max power in dBm |
| Pulse Count | Number of pulses seen in channel per measurement interval. |
| # Interferers | Number of interferers affecting this channel. |

802.11 Statistics:

These statistics may be qualified by channel, sensor, SSID, location, and specific devices.

| Statistic | Description and Notes |
| --- | --- |
| Percent Channel Used | Percentage of time (×2) that the channel is utilized. |
| Percent Retries | Percentage of packets which were retries. |
| Average Data Throughput | Average Data Throughput (in Mbytes/sec) for users on this channel. |
| Average Frame Length | Average length of data frames observed. |
| Minimum Frame Length | Minimum frame length observed. |
| Maximum Frame Length | Maximum frame length observed. |
| Number of Users | Number of active nodes (STA and AP) on the channel |
| RSSI min | Minimum Receive Signal Strength Indicator (RSSI) observed |
| RSSI max | Maximum RSSI observed |
| RSSI avg | Average RSSI observed |
| RSSI std-dev | Std-deviation of RSSI observed. |
| SQI Min | Minimum Signal Quality Indicator (SQI) Observed. |
| SQI max | Maximum SQI observed. |
| SQI avg | Average SQI observed. |
| SQI std-dev | Std-deviation of SQI observed. |
| Management Traffic | Total amount of management traffic, in bytes |
| Multicast Traffic | Total amount of multicast traffic, in bytes |
| Number RTS | Count of RTS Frames |
| Number CTS | Count of CTS Frames |
| Number ACK | Count of ACK frames |
| Number Retries | Count of Retried frames |
| Number Data Frames | Count of Data Frames |
| Number Mgmt Frames | Count of Management Frames |
| Number Multicast | Count of Multicast Frames |
| Number forwarded | Count of Forwarded frames. |
| Too Small | Count of frames that were too small (i.e. less than the minimum size defined in the standard) |
| Too Big | Count of frames that were too big (i.e. greater than the maximum size defined in the standard) |
| Unexpected CTS | Count of CTS frames without a prior RTS frame. |
| Unexpected ACK | Count of ACK frames without a prior data frame. |
| Unknown Request | Count of CTS and ACK frames for unknown STAs |
| Late Response | Count of CTS/ACK frames that were received late. |
| Reserved Type | Count of frames with reserved type, or subtype |
| Reserved Version | Count of frames with reserved version |
| Time for Unexpected Frames | Time (in μsecs) used for unexpected frames. |
| Time for Unknown Frames | Time (in μsecs) used for unknown frames. |
| Number PS Poll and CF End | Count of PS Poll and CF End Frames |

Raw Location Data

In addition to receiving periodic location data via the discovered device interface, it may be desirable for a client to request immediate location operations. These immediate operations may even take place on devices that have not yet even been discovered by the server. An example is in the case of a client that is a location-based authentication system. In this case, a new 802.11 device has been powered on and wants to access the network. Because the device has just become active, it may not yet have been discovered by the server. In this case, the authentication server is able to request an immediate location operation. The following data is supplied by the client in order to "force discovery" of a device, and to perform an immediate location operation on the 802.11 device:

| Field Name | Description and Notes |
| --- | --- |
| 802.11 MAC Address | MAC address of the device. |
| Associating with AP | The entity ID of the AP with which the device is attempting to associate. |

The "Associating with AP" field is used to determine the relative location of the device. This is important so that the proper sensors are used for the location operation. After the immediate location operation has taken place, the 802.11 device becomes part of the discovered set of devices. Its location (and other parameters) may be queried through the interface described above.

Raw Spectrum Data

The client may access a stream of raw SAGE spectrum data from any sensor. The measurement engine in the corresponding sensor generates this data.

Spectrum Stream Configuration

The following fields are contained in a request from a client to configure a new raw spectrum stream for a particular sensor, and are also used to turn off an existing stream.

| Field Name | Description and Notes |
| --- | --- |
| Sensor ID | Sensor Entity ID |
| Start Frequency MHz | Lower range of sensing band |
| End Frequency MHz | Upper range of sensing band |
| Spectrum Analyzer Power vs. Frequency (SAPF) | |
| SAPFSamplesPerSecond (sapfSamplesPerSec) | Number of SAPF samples to deliver per second. '0' indicates no SAPF data stream. |
| NumberSAPFBins (numSapfBins) | Number of SAPF data bins. |
| Spectrum Analyzer Statistics (SA_Stats) Configuration | |
| SA_StatsSamplesPerSecond (saStatsSamplesPerSec) | Number of Stats samples to deliver per second. '0' indicates no Spectrum Analyzer Statistics data stream. |
| PowerThresholdDbm (pwrThreshDbm) | '0': Use default value. Negative value: Use this value. |
| NumSA_StatsBins (numSaStatsBins) | Number of Stats data bins. |
| Pulse Event (PEVT) Configuration | |
| PEVT_EnableFlag (pevtEnableFlag) | '1': Enabled '2': Disabled |
| Pulse Histogram (PHIST) Configuration | |
| UpdateTimeMilliSec (phistUpdateMs) | Milliseconds between updates. '0' indicates no Pulse Histogram data stream. |

Spectrum Analyzer Power vs. Frequency (SAPF)

The following fields describe the streaming data supplied by the server. This data provides a snapshot of data in the frequency spectrum, taken from a single Fast Fourier Transform (FFT) cycle. Within the selected frequency band, the bandwidth is divided into numSapfBins "bins", or frequency sub-bands. For each bin, and for each snapshot, this data reports on the power detected within that bin as measured in dBm.

| Field Name | Description and Notes |
| --- | --- |
| Sequence (sapfSeq) | Starts at 1, increments by 1 for each message. |
| startFreqMHz | Frequency of sapfBins. |
| numSapfBins | Number of bins holding RF spectrum data. This parameter divides the total RF spectrum being measured into numSapfBins adjacent frequency bins of equal bandwidth. Typically 256, but can vary depending on configuration. |
| RF_PowerDataBin | numSapfBins bins containing values representing the dBm power values. The value reflects the energy that the radio "sees" in the portion of the frequency spectrum corresponding to this bin. Typically the largest value you will see is 4 dBm to 5 dBm. All the of the adjacent frequency bins, taken together, provide a spectrum for the full RF range being analyzed. |

Spectrum Analyzer Statistics

The following fields are contained in the streaming data from the server. This data provide a statistical analysis of the data in the frequency spectrum. A single message is built from a specific number of Fast Fourier Transform (FFT) cycles. Statistics may be taken over a time period of 1/10 of a second for a single message. Typically, there are 256 frequency bins.

| Field Name | Description and Notes |
| --- | --- |
| Sequence (statsSeq) | Starts at 1, increments by 1 for each message. |
| Power Threshold (pwrThreshDbm) | Current power threshold used for duty cycle and active bins information. This represents the minimum power the RF spectrum must have to be counted in the duty cycle and active bin statistics (these statistics are discussed further below). This is a configurable test parameter. |
| noiseFloorDbm | Value of the current noise floor. |
| qualityLevel | A number from 0 to 100 indicating the quality of the entire band. 0 is the worst, 100 is the best. Values 0–33 indicate "POOR", 34–66 indicates "GOOD" and 67–100 indicates EXCELLENT. |
| startFreqMHz | Frequency of statsBins. |
| Active Peaks Percent [10] | An array of bins recording the percentage (times 2) of this number of active peaks. |
| numStatsBins | Number of bins holding RF statistics. Typically 256, but can vary depending on configuration. |
| RF_StatisticsDataBin [numStatsBins] | This is any array of 'numStatsBins' of data structures, where each data structure—defined below—provides statistical data on RF values for one frequency bin. All the of the adjacent frequency bins, taken together, span the full range of the spectrum being analyzed. |

Each StatisticsDataBin has the following three sub-fields:

| Field Name | Description and Notes |
| --- | --- |
| avgDbm | Average dBm power level for this frequency bin. |
| maxDbm | Max dBm power level for this frequency bin. |
| dutyPercent | The percentage of time, multiplied by 2, that the power level for this bin remained above a (user-defined) threshold. Examples: 20 represents 10.0%. 3 represents 1.5%. |

Pulse Events

A pulse is a sustained emission of RF energy in a specific bandwidth starting at a specific time. The basic characteristics of an RF pulse are:

Start Time. Measured from when the sensor first begins detecting pulses.

Duration. The lifetime of the pulse.

Center Frequency. The center frequency of the pulse.

Bandwidth. How wide the pulse is.

Power. Average power in dBm.

The overall structure of the pulse event (PEVT) data is shown below:

| Field Name | Description and Notes |
| --- | --- |
| Sequence (pevtSeq) | Starts at 1, incremented by 1 for each message |
| PulseEventCount (pevtsCntThisMsg) | Number of pulse events included in this message. (This is determined by configurable parameters to control when PEVT messages should be issued, plus the number of pulses that actually occurred.) |
| PulseEvents (nsiSmcPevt_t [pevtsCntThisMsg]) | This is any array of 'pevtsCntThisMsg' of data structures, where each data structure—defined below—provides statistical data on RF values for one pulse. |

Each instance of the PulseEvents field describes the properties of one pulse.

| Field Name | Description and Notes |
| --- | --- |
| PulseDetectorID (sdId) | This indicates which of four internal pulse detectors are being used by SAGE. (Pulse detectors are numbered 0 to 3.) |
| termCodeFlags | This byte contains a series of flags which indicate how the pulse was terminated. Bit 0 (LSB): Pulse power outside of hold range Bit 1: Center frequency outside of hold range Bit 2: Bandwidth outside of hold range Bit 3: Duration exceeds durMax A bit is flagged if it's value is '1'. It may be that all four bits are zero; this occurs if a pulse terminates abruptly without any trace. The limiting parameters (power hold range, frequency hold range) are internal to the agent, and cannot be set by the user. |
| dBm | Pulse power in dBm. |
| frqCenterKHz | Center frequency of the pulse in KHz. The value shown will typically range from 0 to 100,000 KHz. To obtain the actual center frequency, add this value to the low end of the frequency spectrum being tested. Example: If the frequency spectrum being tested ranges from 2,350,000 KHz to 2,450,000 KHz, and the frqCenterKhz value is 40,000 KHz, then the actual center frequency of the pulse is approximately 2,390,000 KHz. Note: Actual resolution is ±200 to 500 KHz. |

-continued

| Field Name | Description and Notes |
| --- | --- |
| bandwidthKHz | Bandwidth of the pulse in KHz.<br>Note: Actual resolution is ±200 to 500 KHz. |
| durationUs | Pulse Duration in μseconds |
| pulseStartTime | Pulse Time On (i.e., the time when the pulse first began), in μseconds. The time the pulse began is measured from when the test started running, not from some absolute, fixed date. |

Pulse Histograms

While it is possible to access information about specific pulses, it can be useful to work with the statistical information about the pulses that is provided by pulse histogram (PHIST) messages. The statistics provided by the NSI include:

The distribution of the duration of the pulses (the percentage of pulses with short, medium, and long durations).

The distribution of the gaps in time between the pulses (the percentage of pulses with short time gaps between them, medium time gaps, and long time gaps).

The distribution of pulses by bandwidth.

The distribution of pulses by frequency.

The distribution of pulses by power.

The overall structure of the PHIST data is shown in the following table:

Pulse Duration Histogram

Each of the data bytes, or bins—in sequence—indicates the percentage (multiplied by two) of pulses that fall into a given range of durations.

| Field Name | Description and Notes |
| --- | --- |
| smallBins<br>(smallBins<br>PercentX2) | Each bin contains the percentage (multiplied times 2) of pulses that fell within a {10} μsec range. The range starts with 0 μsec to 9 μsec, and increases by some increment for each consecutive byte. The final bin (bin number 19) covers pulses with widths between 190 to 199 μsec. |
| mediumBins<br>(mediumBins<br>PercentX2) | Each bin contains the percentage (multiplied times 2) of pulses that fell within a {50} μsec range. The range starts with 200 μsec to 249 μsec, and increases by {50} μsec for each consecutive bin. The final bin—which is the 26th bin of the mediumBins, the 46th bin overall, and is numbered as bin 45—covers pulses with widths between 1450 to 1499 μsec. |
| largeBins<br>(largeBins<br>PercentX2) | Each bin contains the percentage (multiplied times 2) of pulses that fell within a {500} μsec range. The range starts with 1500 μsec to 1999 μsec, and increases by {500} μsec for each consecutive bin. The 73rd bin (which is numbered as bin 72) covers pulses with widths between 14499 to 14999 μsec. |

| Field Name | Description and Notes |
| --- | --- |
| Sequence (pevtSeq) | Starts at 1, incremented by 1 for each message |
| NumberOfPulseEvents<br>(numPulseEvents) | Count of the total number of pulse events summed into the histograms that follow. |
| pulseDurationHistogram | This data structure contains a series of bytes. Each of the data bytes, or bins—in sequence—indicates the percentage (multiplied by two) of pulses that fall into a given range of durations. See discussion below for a detailed description of this data structure. |
| pulseGapHistogram | This data structure contains a series of bytes. Each of the data bytes, or bins, in sequence, indicates the percentage (multiplied by two) of gaps between pulses, where the duration of the gap falls within a given time range. The bins do not reflect when the gaps occurred; the bins reflect how long the gaps were. See discussion below for a detailed description of this data structure. |
| pulseBandwidthHistogram<br>(pulseBandwidth<br>PercentX2) | Each data bin reflects a progressively wider bandwidth (for example, 0 to 10 MHz, 10 to 20 MHz, etc.). The value stored in the bin is the percentage, multiplied times two, of the pulses that had a bandwidth somewhere within the range for that bin. See discussion below for a more detailed description of this array. |
| pulseCenterFrequency<br>Histogram<br>(centerFreqPercentX2) | Each data bin reflects a range of frequencies. The value stored in the bin is the percentage, multiplied times two, of the pulses whose center frequency fell within the bin's range of frequencies. See discussion below for a more detailed description of this array. |
| pulsePowerHistogram<br>(powerBinsPercentX2) | Each bin in this histogram reflects a certain power range, measured in dBm. The value of each bin reflects the percentage, multiplied times 2, of those pulses whose power level fell within the indicated range. See discussion below for a more detailed description of this array. |

Pulse Gap Histogram Format: pulseGapHistogram

Instead of measuring the width of pulses, each bin in sequence indicates the percentage (multiplied by two) of gaps between pulses, where the duration of the gap falls within a given time range. Gaps are measured between the start of one pulse and the start of the next. This is because the start of a pulse tends to be sharply delineated, while a pulse may trail off more gradually.

| Field Name | Description and Notes |
| --- | --- |
| smallBins (smallBins PercentX2) | Each consecutive bin contains the percentage (multiplied times 2) of gaps between pulses, where the length of the gap fell within a SMC_PHIST_SMALL_BIN_US {10} μsec range. The range starts with gaps that are 0 μsec to 9 μsec long, and increases by 10 μsec for each consecutive byte. The 20th and final bin (bin number 19) covers gaps whose duration was between 190 to 199 μsec. |
| mediumBins (mediumBins PercentX2) | Each bin contains the percentage (× 2) of gaps whose duration fell within a SMC_PHIST_MEDIUM_BIN_US {50} μsec range. The range starts with 200 μsec to 249 μsec (so all gaps whose duration is within this range are included in this first bin, number 20), and increases by SMC_PHIST_MEDIUM_BIN_US {50} μsec for each consecutive bin. The final bin—which is the 26th bin of the mediumBins, the 46th bin overall, and is numbered as bin 45—covers gaps whose duration was between 1450 to 1499 μsec. |
| largeBins (largeBins PercentX2) | Each bin contains the percentage (× 2) of gaps whose duration fell within a SMC_PHIST_LARGE_BIN_US {500} μsec range. Gaps whose duration was between 2500 μsec to 2999 μsec are reflected in the first bin; each consecutive bin increases the duration by SMC_PHIST_LARGE_BIN_US {500} μsec. The final bin—which is the 27th bin of the largeBins, the 73rd bin overall, numbered as bin 72—covers gaps with widths between 14499 to 14999 μsec. |

Pulse Bandwidth Histogram

Each data byte, or bin, reflects a progressively wider bandwidth. The value stored in the bin is the percentage, multiplied times two, of the pulses that had a bandwidth somewhere within the indicated range. There are a total of 256 bins. In general, the $N^{th}$ bin represents pulses with bandwidths between [(N−1)*binSizeKHz], and [N*binSizeKHz]. Again, the value of the byte represents the %*2 of pulses whose bandwidths fell within this range. There are SMC_PHIST_N_FREQ_BINS {256} bins.

Pulse Center Frequency Histogram

Each data byte, or bin, reflects a range of frequencies. The value stored in the bin is the percentage, multiplied times two, of the pulses whose center frequency fell within the indicated range of frequencies. The range of frequencies that are represented by each bin is determined by the user when this services is configured.

Pulse Power Histogram

Each bin reflects a certain power range, measured in dBm. The value of each bin reflects the percentage, multiplied times 2, of those pulses whose power level fell within the indicated range. The range of each bin is SMC_PHIST_POWER_BIN_SIZE {5} dBm, and the lowest power of the lowest bin is SMC_PHIST_MIN_POWER_DBM {−130} dBm. There are a total of SMC_PHIST_N_POWER_BINS {30} bins.

Raw 802.11 Protocol Data

The client is able to access a stream of filtered 802.11 packets from any sensor.

Protocol Stream Configuration

The following fields are used in a request from a client to configure a raw protocol stream for a particular sensor, and are used to close an existing stream.

| Field Name | Description and Notes |
| --- | --- |
| ConfigurationID | This is used to correlate frame captures with this configuration. The value entered here will be echoed back as part of the data carrying frame information. Only the lower 4 bits should be used. |
| Capture Beacon Flag | Capture beacons, even if not matching filter |
| ThrottleRate | The throttle rate for the filter, which is the limit on the frame capture in kilobits per second. |
| Frame_Filter | Frame filter description |

Protocol Stream Filtered Frame Data

This data is used to send captured 802.11 frames that match the configured filter.

| Field Name | Description and Notes |
| --- | --- |
| Flags | The bits in this field contain a variety of flags, as indicated here: (i) The eighth bit indicates whether or not this frame is a beacon (1 for yes, 0 for no). (ii) The seventh bit indicates whether the $2^{nd}$ antenna was used to received the frame (iii) The sixth bit indicates whether frames were dropped due to throttling (iv) The four least significant bits contain the current configuration (ConfigurationID) that was set when the filter was configured. |
| Pre | Preamble Type/Modulation |
| Rate | Rate Code |
| RSSI | Receive Signal Strength Indication |
| SQI | Signal Quality Indication |
| Frequency | Channel Frequency (in MHz) |
| FullLen | Actual Length received over the Air |
| Tstmp | Receive Timestamp |
| Frame Data | Frame data |

Figure 7:
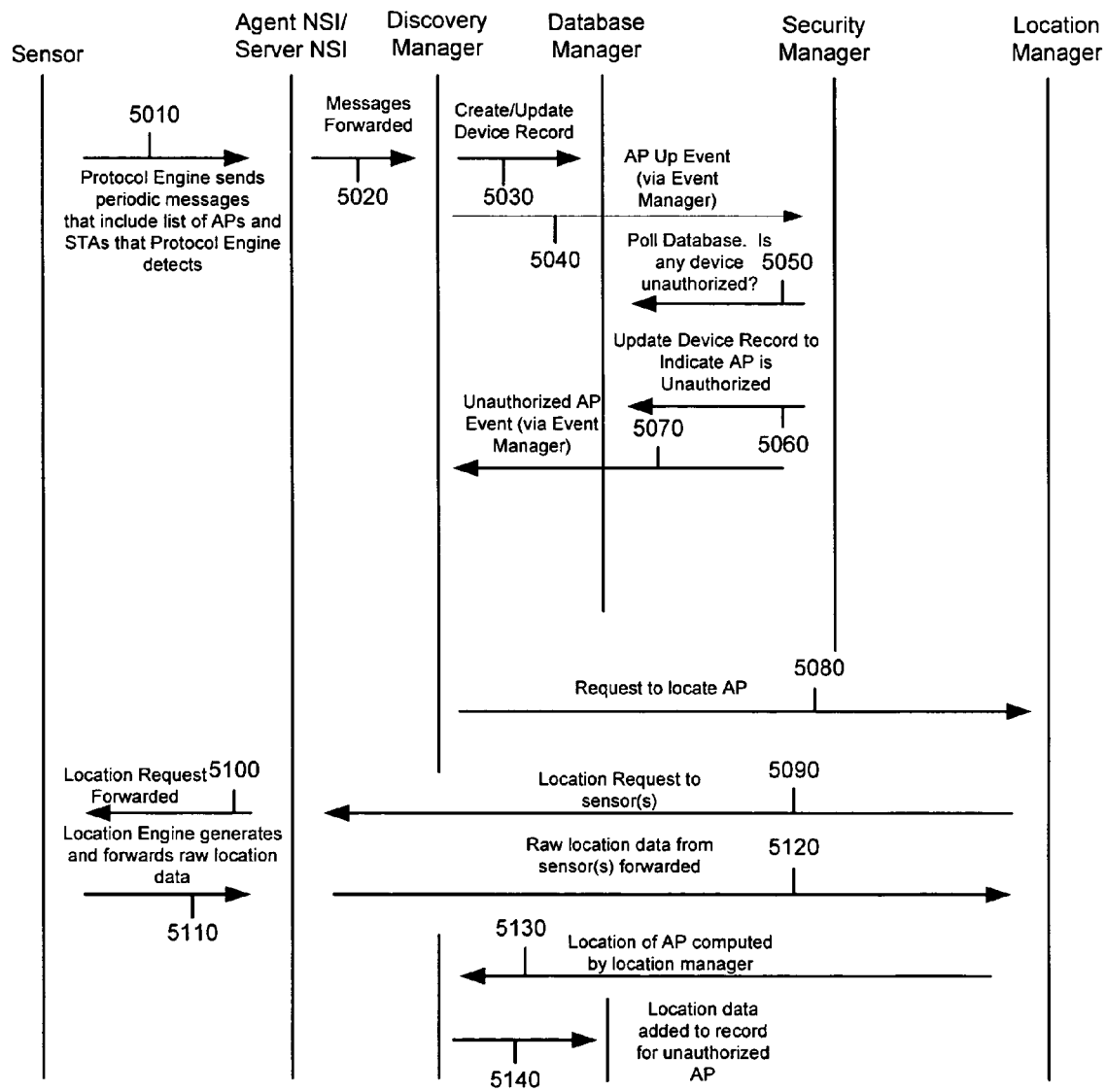
FIGS. 7 and 8 are ladder diagrams of two exemplary processes that may be executed by the system.

FIG. 7 is a ladder diagram that illustrates how the sensor and server coordinate for an exemplary process. The process 5000 of FIG. 7 is one involving detection and location of an unauthorized or "rogue" AP. In step 5010, at a sensor, the protocol engine sends periodic messages that include a list of APs and STAs that are detected from packets that the sensor receives. The messages from the protocol engine are forwarded in step 5020 to the discovery manager in the server. In step 5020, the discovery manager reads the list of information contained in the message from the sensor and generates an AP Up Event that is forwarded to the database to create/update a record. Next, an AP Up Event is forwarded, via the event manager, to the security manager in step 5040. In response to receiving an AP Up Event notice, in step 5050 the security manager polls the database to capture information about the AP associated with the AP Up Event, and compares an address or other identifier of the AP against a list of authorized APs to determine whether or not the AP is authorized. In step 5060, the security manager updates the records in the database to indicate whether or not the AP is authorized. In this example, it is assumed that the AP is not authorized, and such an indication is made in the database. In step 5070, the security manager generates an AP unauthorized event that is forwarded, via the event manager, to the discovery manager.

In response to receiving a notification of the AP unauthorized event, in step 5080, the discovery manager sends a request to the location manager to locate the unauthorized AP. In step 5090, the location manager sends a location request message to the sensors (likely including the sensor that detected the unauthorized AP) to perform a location operation in order to determine the physical location of the AP. In step 5100, the location request message is forwarded by the NSI to the location engine in the respective sensors. The sensors perform the location operation and in so doing generate raw location data that is forwarded to the NSI in step 5110. In step 5120, the NSI forwards the raw location data (from each sensor) to the location manager. The location manager computes the location of the AP using the raw location data from each sensor and in step 5130 forwards the location information to the discovery manager. The discovery manager then forwards this information to the database manager to be added to the record for the unauthorized AP. At various steps along the process 5000 information may be passed out via the ISMI to a client application or device. This is explained above in connection with the ISMI messages.

Figure 8:
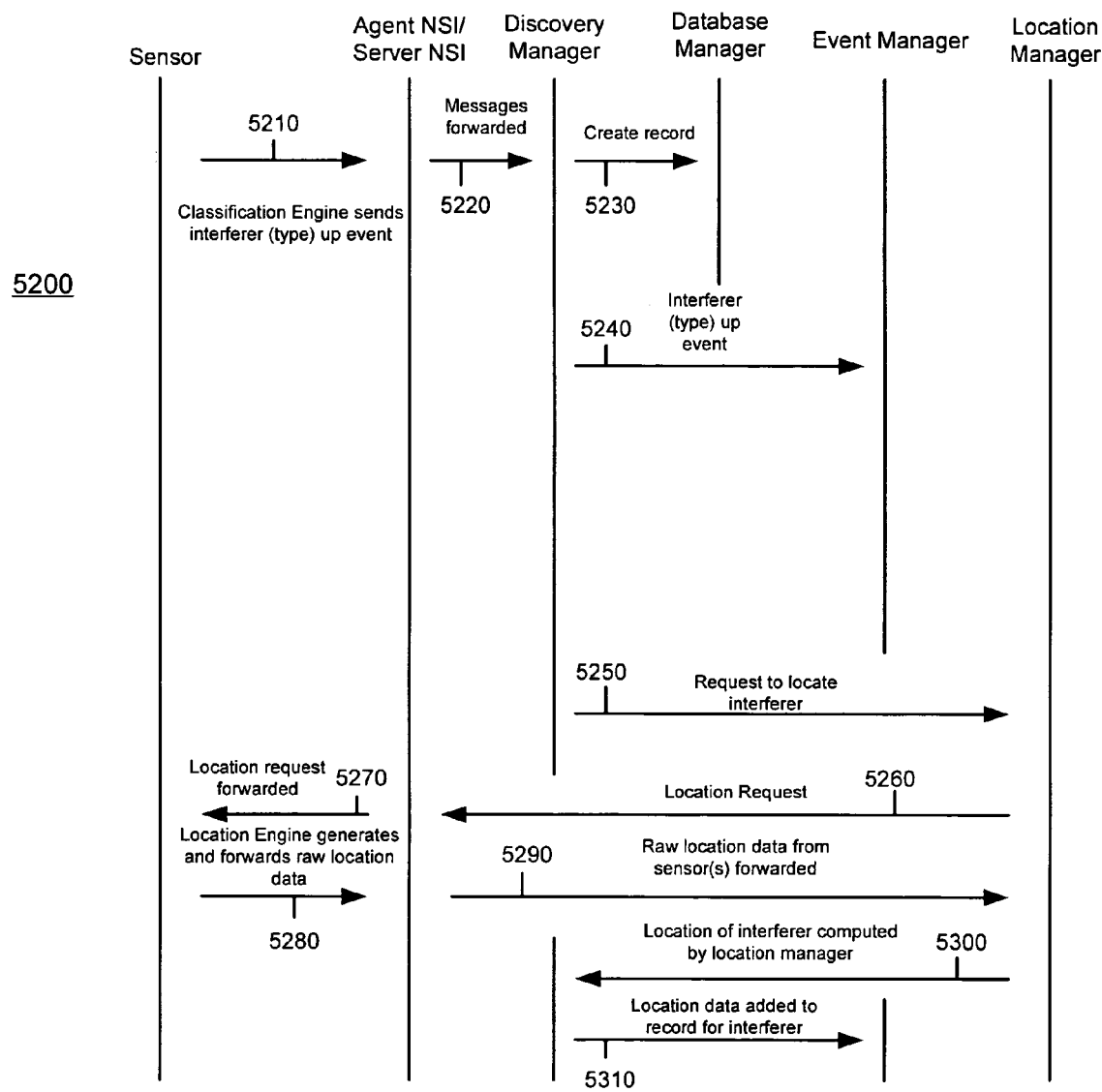

FIG. 8 shows a process 5200 in which an interfering signal (a signal interfering to an 802.11 WLAN) is detected and the source of the signal is located. This process begins with the premise that the classification engine in a sensor has detected an interfering signal and has identified it. In step 5210, the classification engine sends an interfering (type) Up Event to the NSI. The NSI forwards the message in step 5220 to the discovery manager. In step 5230, the discovery manager sends a create record message to the database manager to create a record in the database for the detected interferer. When data is stored in the database for the interferer, the spectrum data (e.g., bandwidth, signal strength, center frequency(ies), duration, etc.) captured by the sensor that detected the interferer may also be stored in the record. Also, in step 5240, the discovery manager sends an interferer (type) Up Event message to the event manager. In step 5250, the discovery manager sends a request to the location manager to locate the source of the interferer. In step 5260, the location manager then sends a location operation request message to the sensors that are used for the location operation. In step 5270, the NSI forwards the location operation request message to the location engine in each sensor used for the location operation. After the sensor generates the raw location data, in step 5280, it forwards it to the NSI which in step 5290 forwards it to the location manager. The location manager computes the location of the interferer and forwards that information in step 5300 to the discovery manager. The discovery manager sends a message to the database manager to add the location data to the record for the interferer.

Though not shown in FIG. 8, it is further possible to obtain additional RF information about the interfering signal by "drilling down" to obtain spectrum statistics from the SAGE of the sensor(s) that detected and classified the interferer. The ISMI may be configured to deliver the spectrum data that was stored in the database record for the interferer either on demand in response to a request from a client application, or automatically upon discovery of the interferer. The spectrum data about the interferer may provide useful information to a network administrator in order to consider evasive or other mitigation actions. Alternatively, the client application may request from the sensor that detected the interferer, via the server, real-time spectrum data that includes more current and additional information about the interferer than what was stored in the database when the interferer was reported to the server.

Another use of location information obtained for a particular device or class of devices (e.g., WLAN STAs) is that information or content can be delivered to certain devices based on their physical location. As an example, in a museum setting, information describing a particular piece of art may be delivered based on a user's proximity to that piece. A similar location model can be used in merchandising applications, where information about a particular product or serviced is delivered to that user when the user's STA is in sufficient proximity to it. Conversely, location may be used to enforce policies that allow access to a wireless network when the device is in a certain region (e.g., visitor or reception area of an enterprise), but not in other areas (e.g., inside the company's facilities). Thus, a visitor having a laptop with WLAN connectivity may have access to a wireless network (to get Internet connectivity), but no (or limited) WLAN connectivity once inside the company's offices. In this latter case, the visitor's STA likely has an address or identifier that is not authorized to the company's WLAN management system, but the discovery manager and or server manager would be configured to permit the visitor's access to the WLAN only in the company's reception area, and only for Internet service.

Locating an IEEE 802.11 Device—Interaction Between Server and Sensors

With reference to FIG. 4, the following is a description of the interaction between the location manager 3220 in the server and the location engine 2730 in sensors in the course of a location measurement operation. The Loc Req and Loc Resp messages referred to above are defined in more detail below. This description assumes that the server has already identified the sensors to be involved in the operation, including which sensor acts as the MRT sensor. In general, the sensor that acts as the MRT is the sensor that receives the signal of the device to be located with the strongest RSSI.

1. The location manager 3220 in the server 3000 sends a set-up message to each of the sensors 2000(*i*) that are to be used in the location process. The set-up message includes the address of the MRT, the frequency channel on which the signals used in the experiment will be on, and the address of the IEEE 802.11 device to be located (often called the target terminal (TT)).

2. Each of the sensors that receive the set-up message configures themselves to prepare for the location operation. In particular, the location engine 2730 requests access to the SAGE snapshot buffer resource via the measurement engine 2710. The snapshot buffer will be in a free-running state continuously storing captured signal data in a circular buffer fashion.

3. After each sensor configures itself in preparation for the location operation, the sensor sends a "ready" message back to the server advising it that it is ready for the operation. Alternatively, the sensors may send this message to the MRT sensor and the MRT sensor sends no such message.

4. If the ready messages from the sensors are sent to the server, the server sends a message to the MRT sensor advising it that it is safe to initiate the location operation. If the ready messages are sent directly to the MRT sensor, then this step is not necessary.

5. To execute the location operation, the MRT sensor sends a series of 802.11 frames. First, the MRT sensor sends a request-to-send (RTS) frame (first signal) addressed to the TT device. The TT device responds with a clear-to-send (CTS) frame (first response signal). After receiving the CTS frame, the MRT sensor sends a unicast Probe Request frame (second signal) to the TT device. The TT device responds to the Probe Request frame with an ACK frame (second response signal). This sequence of frames actually yields two pairs of TDOA measurements (between the RTS and CTS and between the Probe Request and ACK). During this frame exchange sequence, the MRT sensor and the RT sensors in the experiment receive these frames and store in their snapshot buffers the receive signal data (with reference to their own clocks) associated with the signals they received. In particular, the RT sensors are running their snapshot buffers in a continuous store mode and then in response to detecting the Probe Request frame, put their snapshot buffers into a post-store mode that extends long enough to capture the ACK frame. The snapshot buffer in the MRT sensor is continuously storing and stops storing in response to detecting an ACK frame, or timing out if no ACK frame is received. Each of the sensors examines the content of their snapshot buffers, and using the Probe Request frame as a unique reference point, look forward and backward (in time in the snapshot buffer) to identify the RTS/CTS exchange and to identify the ACK frame subsequent to the Probe Request. With the relevant data identified, the location engine 2730 in the sensors then uses suitable correlators to precisely determine the time of arrival of each of the frames, and from that information, determine the time difference of arrival (between the RTS and CTS for one TDOA data point, and between the Probe Request and ACK for another TDOA data point).

6. The sensors send the TDOA data back to the location manager 3220 of the server. The location manager 3220 in the server then performs the computations on the TDOA data to derive the location of the TT.

Locating a Non-802.11 Device (i.e., an Interferer, Such as a Bluetooth Signal, Microwave Oven or Cordless Phone)

This process is different because the TT device does not respond to IEEE 802.11 frames. This process can be used for known interferers as well as interferers that are not known (such as may be the case for a device causing an RF level denial of service attack).

1. The location manager 3220 sends a set-up message to each of the sensors that are to be used in the location process, similar to the set-up message described above, except that it does not include the address of the TT device. Rather, it includes a message informing the MRT sensor to configure the pulse detector(s) in its SAGE block to generate a trigger signal upon detecting the TT signal. From previous transmission of the TT signal, the MRT sensor would already have classified the TT signal and is capable of configuring a pulse detector (in its SAGE block) to continue to detect it and generate a trigger signal in response thereto.
2. The sensors configure themselves, and send a ready signal to the server or MRT sensor. The MRT sensor is ready to initiate the location operation.
3. The MRT sensor transmits a Probe Request frame in response to detecting the TT signal. In doing so, the MRT sensor computes the time delay between receiving the TT signal and sending the Probe Request frame. The RT sensors continuously capture receive signal data and use the Probe Request frame data in the snapshot buffer as a marker for where to look back in the buffer for the TT signal. The RT sensors terminate further capturing of data a short period of time later upon detecting the Probe Request frame. The MRT sensor sends the time delay information it computed to the RT sensors so that the RT sensors can use it to locate the TT signal in their buffers with respect to the Probe Request frame.
4. The location engine 2730 in the MRT sensor and RT sensors then determine the time of arrival of the TT signal and the time of arrival of the Probe Request frame, and from that information compute the TDOA data.
5. The sensors send the TDOA data to the location manager 3220 in the server 3000, where the location is computed based on the TDOA data.

If the interfering signal is a signal that none of the sensors have a correlator for (in order to accurately determine the time of arrival of the device's signal transmissions), then one technique is to use as a reference waveform (a correlator) the receive signal sample data obtained at the RT sensor that best receives the interferer's signals. An example of this technique is disclosed in aforementioned commonly assigned U.S. patent application Ser. No. 60/469,647, filed May 12, 2003.

Figure 9:
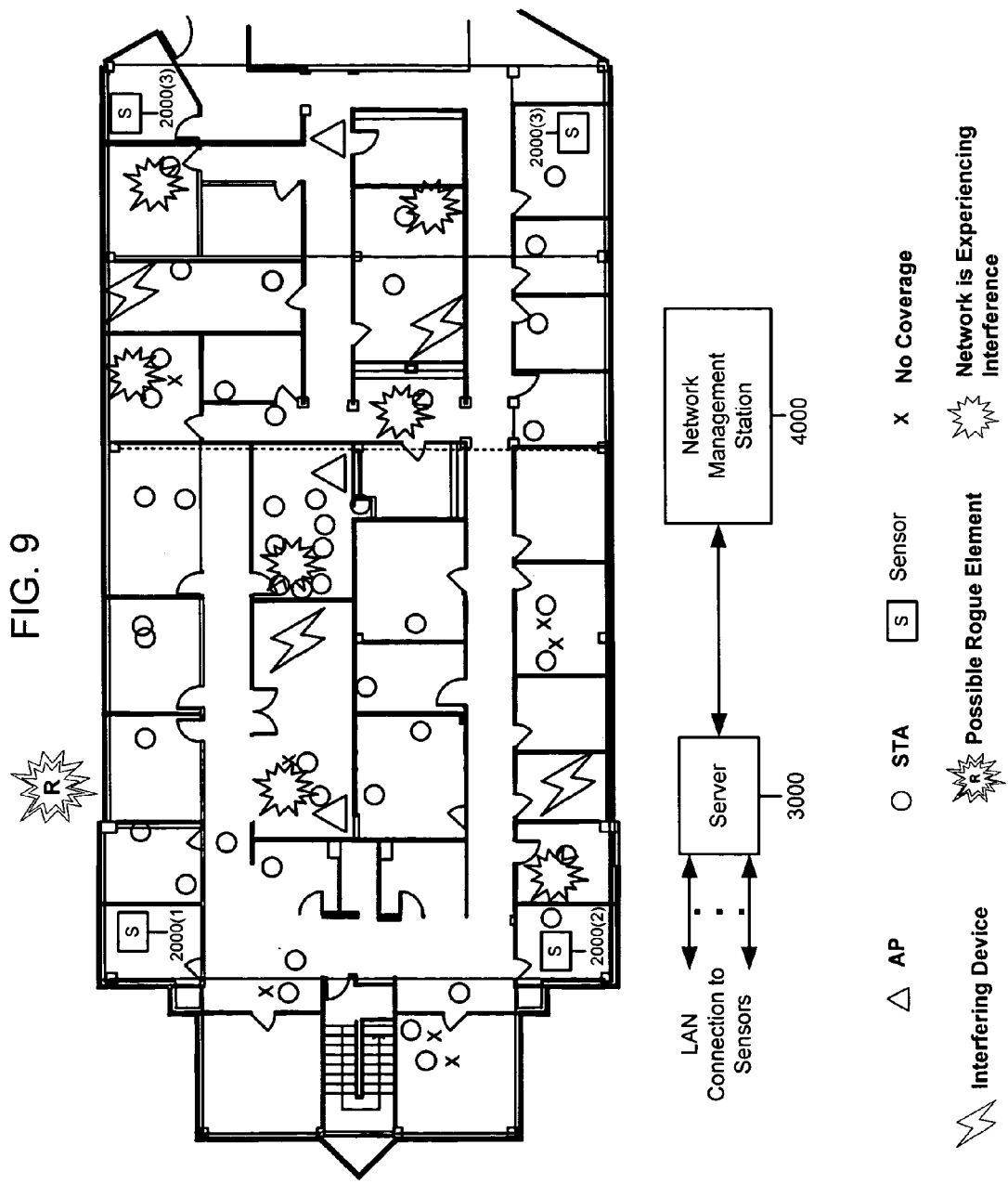
FIG. 9 is a diagram showing how pluralities of sensors are deployed in an office environment in which WLAN and other activity is occurring.
Figure 10:
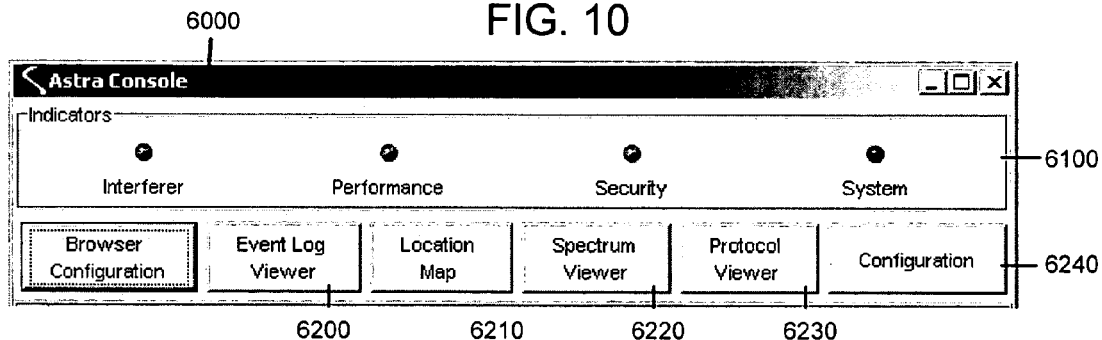
FIG. 10 is a diagram showing a launcher bar of a console graphical user interface client application.

FIG. 9 illustrates how a plurality of sensors 2000(1) to 2000(4) are deployed within an office environment and coupled to a server 3000. A network management station 4000, executing one or more network management client applications, is coupled to the server. The sensors 2000(1) to 2000(4) will detect the activity occurring in the frequency band and the network management station 4000 may generate a location map display that indicates locations of APs, STAs, no WLAN coverage areas, possible rogue devices, where interference devices, etc. In a multiple floor building, there may be similar configurations, and a single or multiple servers may couple to sensors deployed throughout the building, and servers associated with each building on a multi-building campus site may be coupled to a super server, as described above in conjunction with FIG. 1. Moreover, it is further envisioned that a super server may manage, via a WAN connection perhaps using the Internet, multiple servers associated with building sites at multiple geographic locations.

With reference to FIGS. 10–17 are diagrams depicting an example of a client application that consists of a graphical user interface (GUI) application to display data generated by the server and configure functions of the server.

Figure 11:
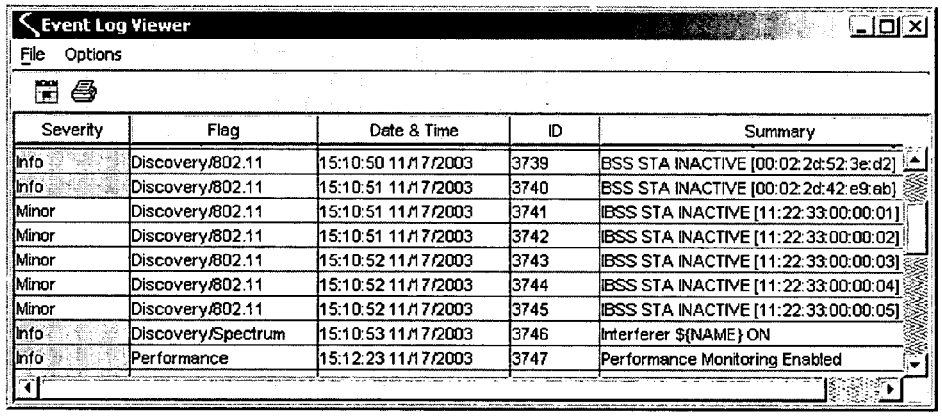
FIGS. 11–17 show various console application display screens that display data generated by the server.
Figure 12:
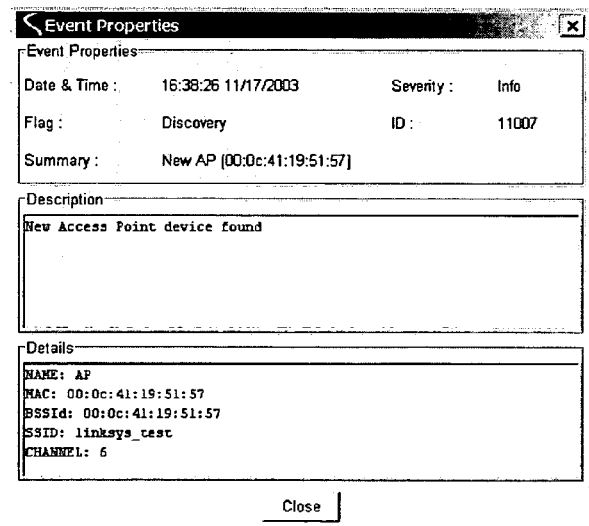
Figure 13:
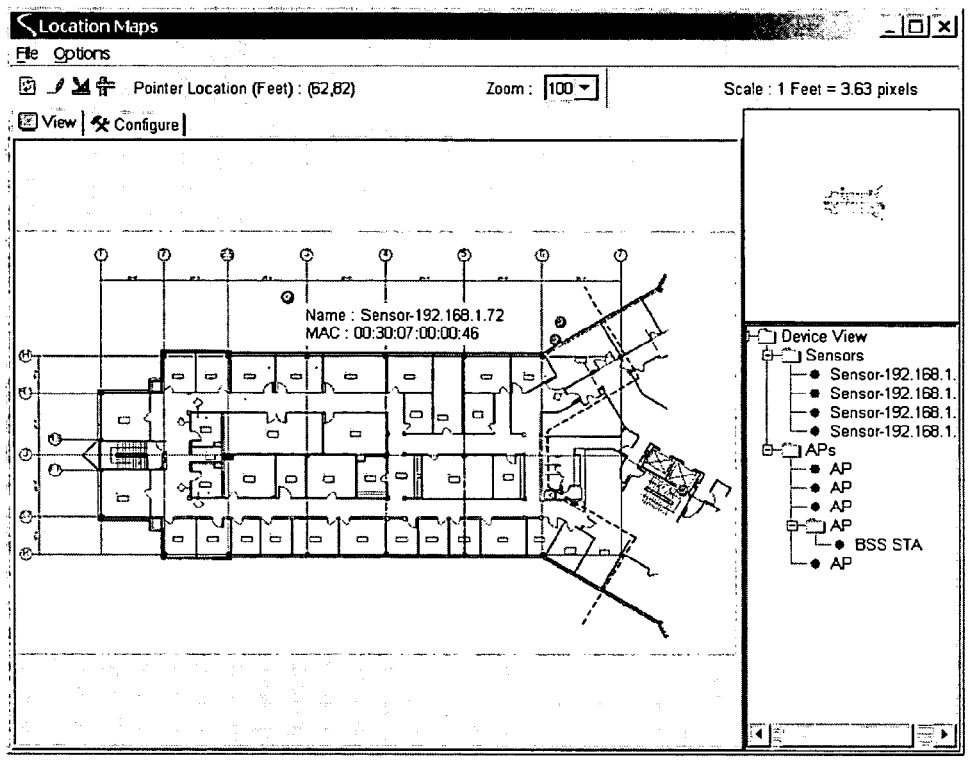
Figure 14:
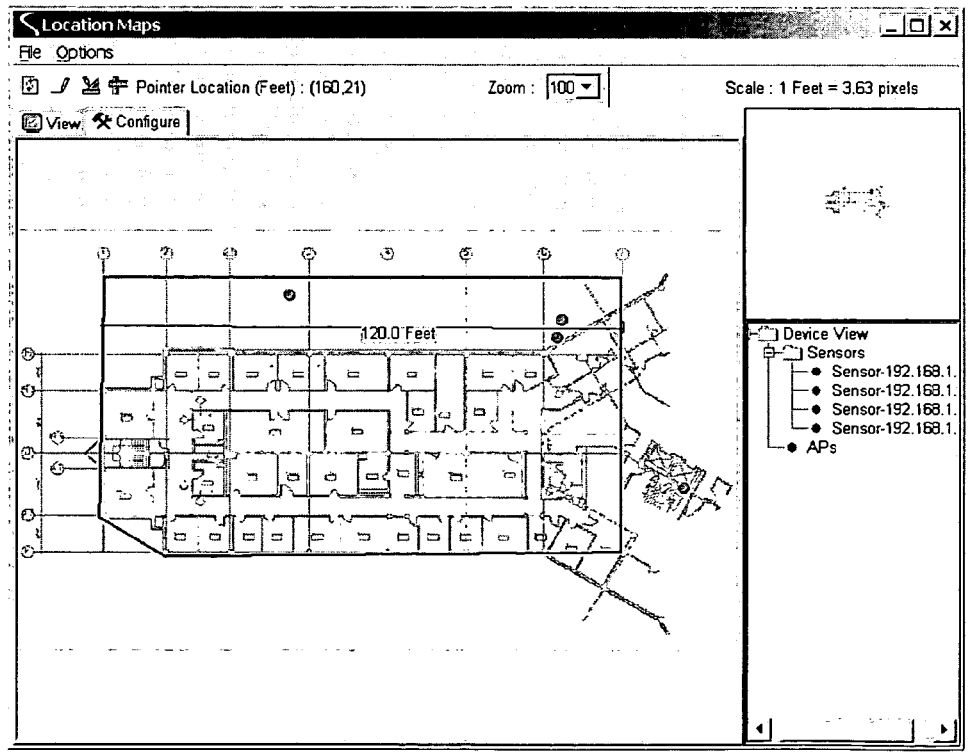
Figure 15:
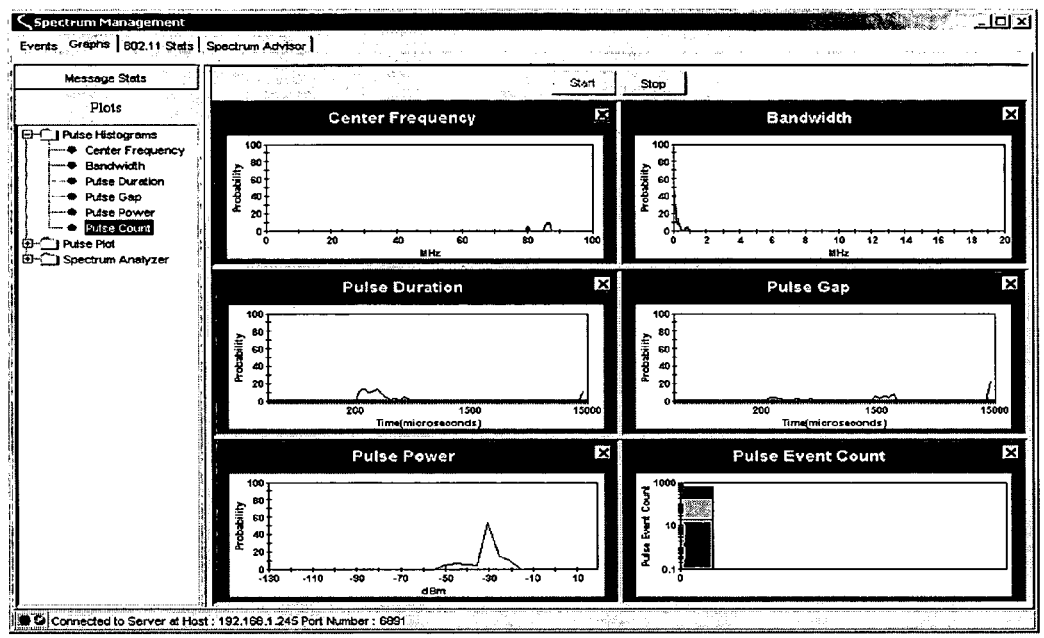
Figure 16:
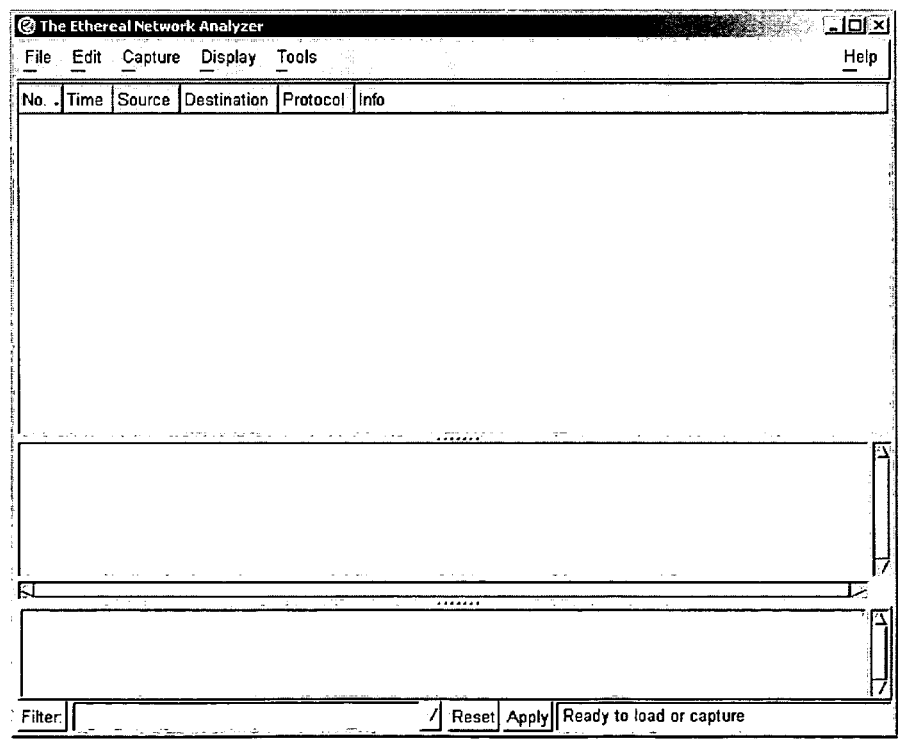

The GUI application is referred to hereinafter as a console application and it has a launcher bar 6000 with indicators 6100 and buttons 6200 through 6240. The console application communicates with the server through the ISMI. The ISMI may be implemented in XML and SNMP. At any time, a user may access information on a WLAN and the surrounding RF environment by selecting any of the console's viewers: the event log viewer shown in FIGS. 11 and 12 is accessed via button 6200, the location map shown in FIGS. 13 and 14 is accessed via button 6210, the spectrum viewer shown in FIG. 15 is accessed via button 6220 and the protocol viewer shown in FIG. 16 is accessed via button 6230. The configuration button 6240 provides access to a configuration screen shown in FIG. 17.

The four status indicators 6100 (system, interference, performance and security) on the launcher bar are similar to the LEDs found on many electronic devices. Each indicator may have three colors: Green, Yellow, and Red. Any change in color indicates that a certain severity event has taken place.

As shown in FIGS. 11 and 12, the event log viewer maintains a running list of all WLAN and RF events, such as RF devices which have been turned on or off. FIG. 11 shows the list, and FIG. 12 shows the details of particular event selected from the list shown in FIG. 11. Each record in the event log display has the following fields: severity, flag, date and time, ID, and summary. The severity levels for an event are severe, major, minor, info, and debug and are explained as follows.

Severe. The event may result in, or has resulted in, major failure of the WLAN integrity. This may include an AP failure, or a security attack which is preventing network operations or compromising network security (such as a rogue AP, 802.11 device operating outside the security perimeter, and denial of service attack).

Major. The WLAN is still running, but the event is causing or may cause a significant impact on network performance or security. This may include clients that have disappeared from the network without logging out, APs or clients running at very low data rates, major excess load on one or more channels, significant increases in RF interference and detection of potential security threats.

Minor. The event represents an unusual behavior which may signal potential problems. Includes significant retransmissions of frames, moderate excess load on one or more channels, suspicious device movement and moderate increases in RF interference.

Info. The event is not judged to pose a significant concern to network security or performance.

Debug. These are specialized events that a user will not normally want to see, but that may need to see in order to identify a problem with the system itself.

One or more flags indicate the general type of event:

Discovery. A new device has been identified (may be an 802.11 device or an interferer).

Security. The event has some impact on network security (for example, a rogue AP has been detected, or a device is transmitting without using WEP encryption).

Performance. There has been some significant change in WLAN performance.

System. The event reflects an issue with the system itself, such as sensor or server problems.

Spectrum. New or unusual RF activity has been detected. This is often associated with the discovery of a new interferer.

Location. A device has been located, or a device has been moved.

802.11. The event concerns an 802.11 device, such as a new device joining the network, or an AP that is no longer functioning.

In FIGS. 13 and 14, the location map shows the location of all RF sources and facilitates configuring a security perimeter. By moving the cursor over an device icon on the map, the name, IP address and MAC address is displayed. FIG. 14 shows how a user may draw a security perimeter overlaid on the map.

FIG. 15 shows the how spectrum viewer displays raw RF spectrum and pulse data as detected by a specific sensor. A user can select which sensor's data is displayed. The protocol viewer displays both detailed and summary information on 802.11 frames which are detected by sensors in the system. Additional examples of the spectrum viewer displays are disclosed in commonly assigned and co-pending U.S. application Ser. No. 10/420,515.

FIG. 16 illustrates how the protocol viewer displays protocol statistics.

Figure 17:
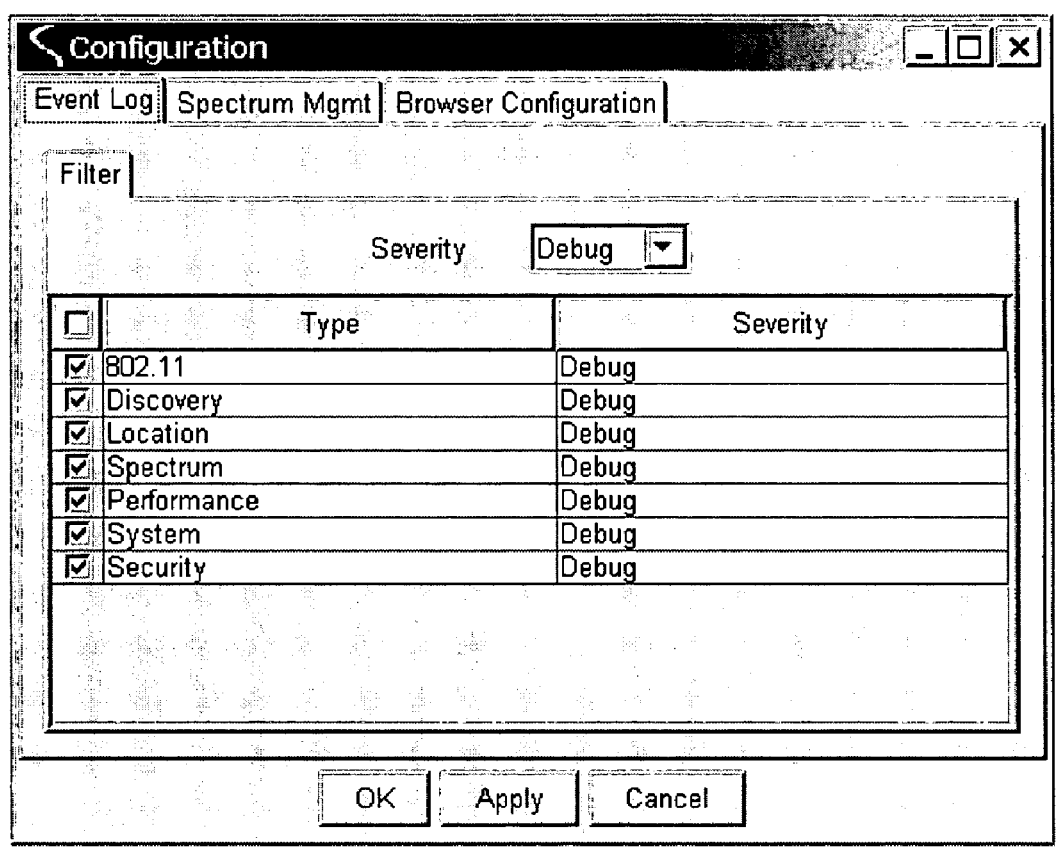

FIG. 17 illustrates a configuration dialog that enables a user to configure which types of events to be reported by the event log (e.g., 802.11 events, location events, performance events, security events, etc.); and the minimum severity of the events that will be shown (all events, minor problems, major problems, etc.). The configuration dialog and also allows a user to configure the kinds of plots displayed by the spectrum viewer. A user can choose which types of events to be shown on the event log. A single event will often have multiple flags. Moreover, a user can control both the types of events that should be displayed, and the level of severity associated with that event.

In sum, a system is provided that monitors activity in a shared frequency band and on a wireless network that operates in the shared frequency band. The system comprises a server and a plurality of radio sensors that are coupled to the server and are positioned at various locations in a region where activity in a shared radio frequency band is occurring. Each of the plurality of radio sensors comprises a first radio receiver capable of receiving radio signals in a radio frequency band; a spectrum analysis system coupled to the radio receiver that produces spectrum activity information representative of the activity in the frequency band; a baseband signal processing section coupled to the first radio receiver that demodulates signals transmitted by other devices on a wireless network in the frequency band according to the communication protocol; a second radio receiver coupled to the baseband signal processing section that receives signals on the wireless network and couples received signals to the baseband signal processing section. The baseband signal processing section may be further capable of modulating signals in accordance with the communication protocol for transmission on the wireless network in the frequency band. In this latter case, the sensor further comprises a transmitter that transmits signals modulated by the baseband signal processing section.

A processor is coupled to the spectrum analysis system and to the baseband signal processing section, wherein the processor executes one or more programs to analyze packets transmitted by devices on the wireless network in the frequency band based on signals demodulated by the baseband signal processing section and to classify radio signals occurring in the frequency band based on the spectrum activity information output by the spectrum analysis system. The server receives data from each of the plurality of radio sensors and executes functions to process the data supplied by the plurality of sensors.

The server executes a the server executes a performance function that monitors and generates events related to the performance of the wireless network, a discovery function that monitors and generates events pertaining to devices operating in the wireless network or other radio frequency emitters in the frequency band and a security function that monitors and generates events related to security threats to the wireless network. In addition, the server interfaces data generated by its various functions to a client application, e.g., a network management application. The server is configurable by a network management application through an application programming interface (API) with respect to the type of information requested about activity in the wireless network and/or frequency band, and the server supplies aggregated data from the plurality of radio sensors to the network management application through the API.

Similarly, a method is provided for analyzing data pertaining to activity in a shared radio frequency band comprising steps of receiving data from each of a plurality of radio sensor devices deployed in different locations to detect activity in the radio frequency band, wherein the data includes identifiers types of signals determined to be occurring in the frequency band and statistics concerning traffic on wireless network operating in the radio frequency band; aggregating the data; and analyzing the data. The step of analyzing may comprise executing a performance function that monitors performance of the wireless network based on aggregated traffic statistics, executing a discovery function that monitors and generates events pertaining to devices operating in the wireless network or other radio frequency emitters in the frequency band, and executing a security function that monitors and generates events related to security threats to the wireless network.

Further, a method is provided for interfacing a network management application with a plurality of radio sensor devices that monitor activity in a frequency band in which a wireless network and other interfering signal activity may be occurring, comprising steps of receiving configurations from the network management application concerning the type of information requested about activity in the wireless network and/or frequency band; and supplying data concerning activity in the wireless network and/or frequency band according to configurations. This corresponds to the ISMI API function executed by the server.

Likewise, a method is provided for interfacing a network management application with a plurality of radio sensor devices that monitor activity in a frequency band in which a wireless network and other interfering signal activity may be occurring, comprising generating configurations at the network management application concerning the type of information requested about activity in the wireless network and/or frequency band; and receiving data concerning activity in the wireless network and/or frequency band according to configurations. This corresponds to the ISMI API function executed by a client application. Similarly, this ISMI API function may be embodied by instructions encoded on a processor readable medium, that, when executed by processor (the processor running the client application), the processor performs the steps described above. Finally, this ISMI API function may be embodied as part of a system comprising the application program (the client application) and the application programming interface that executes the steps described above.

The above description is intended by way of example only.

What is claimed is:

1. A radio sensor device comprising:
   a. a first radio receiver capable of receiving radio signals in a radio frequency band;
   b. a spectrum analysis system coupled to the first radio receiver that produces spectrum activity information representative of the activity in the frequency band;
   c. a baseband signal processing section that demodulates baseband signals transmitted by other devices on a wireless network in the frequency band according to a communication protocol;
   d. a second radio receiver coupled to the baseband signal processing section that receives signals transmitted on the wireless network and couples received signals to the baseband signal processing section; and
   e. a processor coupled to the spectrum analysis system and to the baseband signal processing section, wherein the processor executes one or more programs to analyze packets transmitted on the wireless network in the frequency band based on signals demodulated by the baseband signal processing section and to classify radio signals occurring in the frequency band based on the spectrum activity information output by the spectrum analysis system.

2. The radio sensor device of claim 1, wherein the spectrum analysis system produces spectrum activity information including pulse events representing occurrences of radio frequency pulses that match one or more criteria including one or more of bandwidth, duration and center frequency.

3. The radio sensor device of claim 1, and further comprising a buffer that stores digital data derived from energy received by the first radio receiver for an interval of time.

4. The radio sensor device of claim 3, wherein the processor executes a program to trigger the buffer to capture the digital data associated with reception of a signal transmitted by a device to be located and a reference signal transmitted by another device, and from the digital data the processor computes a time difference of arrival at the sensor device of the signal transmitted by the device to be located and the reference signal.

5. The radio sensor device of claim 1, wherein the processor generates statistics about packets transmitted in the frequency band between devices in the wireless network including type of packets, volume of packet traffic, number of packet retransmissions and identifiers of devices transmitting packets.

6. The radio sensor device of claim 5, wherein the processor generates statistics on a received packets on a per channel, per device or per packet field identifier basis.

7. The radio sensor device of claim 5, wherein the processor filters packets to be analyzed for purposes of generating statistics.

8. The radio sensor device of claim 1, wherein the processor generates a quantity that represents a general quality of the frequency band based on the number and the type of signals that are determined to be occurring in the frequency band.

9. The radio sensor device of claim 1, wherein the baseband signal processing section modulates signals in accordance with the communication protocol for transmission on the wireless network, and further comprising a transmitter coupled to the baseband signal processing section for transmitting signals modulated by the baseband signal processing section.

10. The radio sensor device of claim 9, wherein the processor controls the baseband signal processing section to modulate a reference signal in accordance with the communication protocol for transmission on the wireless network, wherein the reference signal is used in a process to locate a device operating in the frequency band.

11. The radio sensor device of claim 1, wherein the processor generates signals to control the first radio receiver and the second radio receiver independently of one another.

12. A system for monitoring activity in a shared frequency band, comprising:
   a. a plurality of radio sensors positioned at various locations in a region where activity in a shared radio frequency band is occurring, each of the plurality of radio sensors comprising:
      i. a first radio receiver capable of receiving radio signals in a radio frequency band;
      ii. a spectrum analysis system coupled to the first radio receiver that produces spectrum activity information representative of the activity in the frequency band;
      iii. a baseband signal processing section that demodulates baseband signals transmitted by other devices on a wireless network in the frequency band according to a communication protocol;
      iv. a second radio receiver coupled to the baseband signal processing section that receives signals transmitted on the wireless network and couples received signals to the baseband signal processing section; and v. a processor coupled to the spectrum analysis system and to the baseband signal processing section, wherein the processor executes one or more programs to analyze packets transmitted on the wireless network in the frequency band based on signals demodulated by the baseband signal processing section and to classify radio signals occurring in the frequency band based on the spectrum activity information output by the spectrum analysis system; and b. a server coupled to the plurality of radio sensors that receives data from each of the plurality of radio sensors and that executes functions to process the data supplied by the plurality of sensors.

13. The system of claim 12, wherein the server communicates with each of the plurality of radio sensors to configure parameters associated with generation of packet statistics and classification of signals by each radio sensor.

14. The system of claim 12, wherein the server configures the types of signals to be classified by one or more radio sensors.

15. The system of claim 12, wherein the baseband signal processing section modulates signals in accordance with the communication protocol for transmission on the wireless network, and further comprising a transmitter coupled to the baseband signal processing section for transmitting signals modulated by the baseband signal processing section.

16. The system of claim 15, wherein the processor controls the baseband signal processing section to modulate a reference signal in accordance with the communication protocol for transmission on the wireless network, wherein the reference signal is used in a process to locate a device operating in the frequency band.

17. The system of claim 12, wherein each of the radio sensors comprises a buffer that stores digital data derived from energy received by the first radio receiver for an interval of time.

18. The system of claim 17, wherein the server sends a location set-up message to a select group of radio sensors to prepare them for a location operation, wherein the message identifies the radio sensor that is to act as a master reference terminal and identifies the device to be located.

19. The system of claim 18, wherein in response to receiving the location set-up message from the server, the processor in each radio sensor in the select group executes a program to trigger the buffer to begin continuously capturing digital data associated with energy received by the radio receiver.

20. The system of claim 19, wherein in the master reference terminal sensor, the baseband signal processing section modulates signals in accordance with the communication protocol for transmission on the wireless network, and further comprising a transmitter coupled to the baseband signal processing section for transmitting signals modulated by the baseband signal processing section.

21. The system of claim 20, wherein the master reference terminal sensor transmits a first signal addressed to the device to be located, and in response thereto, the device to be located transmits a first response signal.

22. The system of claim 21, wherein in response to receiving the first response signal, the master reference terminal sensor transmits a second signal to the device to be located and the device to be located transmits a second response signal.

23. The system of claim 22, wherein the radio sensors in the select group and the master reference terminal sensor process the data captured by their buffers to determine the time of arrival of each of the signals and to compute the time difference of arrival between the first signal and the first response signal and between the second signal and the second response signal, and transmit the time difference of arrival data to the server.

24. The system of claim 22, wherein the device to be located is a device compatible with the IEEE 802.11 standards, and wherein master reference terminal sensor transmits the first signal as a request-to-send (RTS) frame and the first response signal is a clear-to-send (CTS) frame, and the master reference terminal sensor transmits the second signal as a Probe Request frame to the device to be located and the second response signal is an ACK frame.

25. The system of claim 21, wherein the radio sensors in the select group and the master reference terminal sensor process the data captured by their buffers to determine the time of arrival of each of the signals and to compute the time difference of arrival between the first signal and the first response signal, and transmit the time difference of arrival data to the server.

26. The system of claim 21, wherein the server computes the location of the device to be located based on the time difference of arrival data received from the select group of radio sensors.

27. The system of claim 21, wherein the device to be located is a device compatible with the IEEE 802.11 standards, and wherein master reference terminal sensor transmits the first signal as a request-to-send (RTS) frame and the first response signal is a clear-to-send (CTS) frame.

28. The system of claim 12, wherein the server aggregates the data from the plurality of radio sensors and formats portions of the data for interface to a network management application.

29. The system of claim 12, wherein the server stores data from the plurality of radio sensors in a database.

30. The system of claim 29, wherein the server stores in the database configuration information associated with functions of the server and the radio sensors and data generated by the plurality of radio sensors.

31. The system of claim 29, wherein the server stores data from the radio sensors in a plurality of interrelated data structures.

32. The system of claim 31, wherein the server stores data pertaining to the signals determined to be occurring in the frequency band by one or more radio sensors in a classification statistics data structure containing data about the signal in fields including a device-ON indicator, a classification identifier that identifies a device type, a product identifier that identifies a specific product and a confidence measure that indicates a certainty of the classification identifier.

33. The system of claim 31, wherein the server stores data pertaining to signals that are interferers to the wireless network determined to be occurring in the frequency band in an interferer data structure in fields that include a device-ON indicator, a classification identifier that identifies a device type, a product identifier that identifies a specific product and a confidence measure that indicates a certainty of the classification identifier.

34. The system of claim 29, wherein the server stores data associated with events occurring in the frequency band and/or wireless network in an event data structure and an event types data structure that is linked to the event data structure.

35. The system of claim 34, wherein the server stores data in the event types data structure in fields including one or more of name, severity level, summary and description.

36. The system of claim 12, wherein the server executes a performance function that monitors and generates events related to the performance of the wireless network, a discovery function that monitors and generates events pertaining to devices operating in the wireless network or other radio frequency emitters in the frequency band and a security function that monitors and generates events related to security threats to the wireless network.

37. The system of claim 36, wherein the server further executes a location function that communicates with a select group of radio sensors to obtain data from the select group of radio sensors that the location function uses to determine locations of wireless network and other radio frequency emitters in the frequency band; a protocol manager function that aggregates packet statistics generated by the radio sensors; and a radio frequency manager function that aggregates spectrum activity information and signal classification information generated by the radio sensors.

38. The system of claim 37, wherein the server executes the discovery function to interact with the location function in order to obtain a location of a wireless network device other radio frequency emitters determined by the discovering manager to be discovered by a radio sensor.

39. The system of claim 37, wherein the server executes the security function to interact with the location function in order to obtain a location of a wireless network device or other radio frequency emitters that pose a security threat to the wireless network.

40. The system of claim 37, wherein the server executes the performance function to interact with the protocol manager function to monitor packet activity in the wireless network for security threats.

41. The system of claim 36, wherein the performance function, discovery function and security function are configurable with respect to the types of activity they monitor in the data supplied by the location function, protocol manager function and radio frequency manager function.

42. The system of claim 12, wherein the processor in at least one radio sensor generates a measurement of the general quality of the frequency band in its proximity based on the number and type of signals determined to be occurring in the frequency band.

43. The system of claim 12, wherein the server manages information pertaining to a building site in which a plurality of radio sensors are located, and a plurality of zones within the building site in which one or more radio sensors are located.

44. The system of claim 43, wherein based on data collected from the plurality of radio sensors, the server generates for each zone, an indication of one or more of a degree of severity of interfering signal activity, wireless network performance level, and security status of the wireless network.

45. The system of claim 44, and further comprising a plurality of servers each coupled to an associated plurality of radio sensors, and a super server coupled to the plurality of servers to manage the plurality of servers.

46. The system of claim 12, wherein the server generates a list of devices discovered in the frequency band based on the signals determined to be occurring in the frequency band by the plurality of radio sensors.

47. The system of claim 46, wherein the server generates, for each device discovered in the frequency band, information selected from the group consisting of: an identifier of the type of device (interferer or wireless network), time that the device is discovered, time the device is determined to no longer be present, identifier of the one or more radio sensor(s) that discovered the device, physical location of the device and the time at which the location was determined and indication of movement of a device that was designated as a fixed location device.

48. The system of claim 46, wherein the server generates, for each device that is discovered and determined to be an interferer to the wireless network, information selected from the group consisting of: general classification of the device, specific product type if it has been determined, measure of confidence that the classification and/or specific product type are accurate, alternate classification and specific product types and associated measure of confidences, type of device including frequency hopping, non-frequency hopping and continuous signal.

49. The system of claim 12, wherein the server configures thresholds for statistics derived from the data supplied by the radio sensors, which when crossed, the server generates an alarm event.

50. The system of claim 49, wherein the server configures a threshold for one or more of the following statistics derived from data generated by the radio sensors: number of interfering signals occurring in a channel, percentage of time that the power level for a channel remains above a power threshold, number of radio frequency pulses occurring in a channel during a measurement interval, a measurement of the general quality of a channel based on the number and type of interfering signals to the wireless network determined to be occurring in the frequency band.

51. The system of claim 12, wherein the server generates events associated with activity detected in the wireless network and/or frequency band.

52. The system of claim 51, wherein the server generates information indicating an event type, wherein the event type is selected from the group consisting of: discovery of a new device, performance of the wireless network, security of the wireless network and location of a device.

53. The system of claim 52, wherein for an event related to a security issue, the server generates an indication of the type of security issue selected from the group consisting of: a device accessing the wireless network from an unauthorized location, the type of device accessing the wireless network from an unauthorized location, an unauthorized access point operating on the wireless network, a protocol level denial of attack on the wireless network and a radio signal level denial of attack on the wireless network characterized by a radio signal of a relatively long duration across a substantial portion of the frequency band.

54. The system of claim 53, wherein the server generates for each event information selected from the group consisting of: an identifier of the type of event, a timestamp associated with the time that the event occurred, a list of the radio sensors that detected the event, an identifier for the site in which the event occurred, an identifier for a zone in the site in which the event occurred and an indication of the severity of the event.

55. The system of claim 12, wherein the server is configurable by a network management application through an application programming interface (API) with respect to the type of information requested about activity in the wireless network and/or frequency band, and the server supplies data from the plurality of radio sensors to the network management application through the API.

* * * * *